US012133139B2

(12) United States Patent
Abbott et al.

(10) Patent No.: US 12,133,139 B2
(45) Date of Patent: Oct. 29, 2024

(54) DETECTING HANDHELD DEVICE MOVEMENTS UTILIZING A HANDHELD-MOVEMENT-DETECTION MODEL

(71) Applicant: Lyft, Inc., San Francisco, CA (US)

(72) Inventors: Alya Abbott, San Francisco, CA (US); Alexander Wesley Contryman, San Francisco, CA (US); Devjit Chakravarti, Orinda, CA (US); Julien van Hout, San Francisco, CA (US); Zhan Zhang, Mountain View, CA (US); Gautam Kedia, Belmont, CA (US)

(73) Assignee: Lyft, Inc., San Francisco, CA (US)

( * ) Notice: Subject to any disclaimer, the term of this patent is extended or adjusted under 35 U.S.C. 154(b) by 743 days.

(21) Appl. No.: 17/070,439

(22) Filed: Oct. 14, 2020

(65) Prior Publication Data

US 2022/0116743 A1    Apr. 14, 2022

(51) Int. Cl.
*H04W 4/02* (2018.01)
*H04W 4/029* (2018.01)
*H04W 4/38* (2018.01)

(52) U.S. Cl.
CPC ........... *H04W 4/026* (2013.01); *H04W 4/027* (2013.01); *H04W 4/029* (2018.02); *H04W 4/38* (2018.02)

(58) Field of Classification Search
CPC ....... H04W 4/026; H04W 4/38; H04W 4/029; H04W 4/027
See application file for complete search history.

(56) References Cited

U.S. PATENT DOCUMENTS 9,086,948 B1 * 7/2015 Slusar .................... G01S 13/00
9,465,214 B2   10/2016 Feldman
(Continued)

FOREIGN PATENT DOCUMENTS

AU    2018313085 A1    3/2020
CN    109547988 A      3/2019
(Continued)

OTHER PUBLICATIONS

U.S. Appl. No. 16/820,528, filed May 10, 2023, Office Action.
(Continued)

*Primary Examiner* — Ernest G Tacsik
(74) *Attorney, Agent, or Firm* — Keller Preece PLLC

(57) ABSTRACT

The present application discloses systems, methods, and computer-readable media that can utilize a handheld-movement-detection model to detect whether a computing device is moved by hand or otherwise by a person within a vehicle. For instance, the disclosed systems can receive movement data from a computing device and generate filtered signals. Subsequently, the disclosed systems can utilize the handheld-movement-detection model to convert the filtered signals into a binary movement-classification signal (based on a signal threshold) to indicate the presence of handheld movement of a device. Furthermore, the disclosed systems can also utilize movement data from a computing device to detect whether the computing device is mounted and/or to detect vehicular movements. Additionally, the disclosed systems can configure (or adjust) parameters of the handheld-movement-detection model by utilizing movement data from a computing device that is secured to a vehicle and movement data of a computing device that is moveable within the vehicle.

20 Claims, 18 Drawing Sheets

(56) References Cited

U.S. PATENT DOCUMENTS

| | | | |
|---|---|---|---|
| 9,654,932 B1* | 5/2017 | Mukhtar | H04W 4/027 |
| 9,691,115 B2* | 6/2017 | Abramson | H04M 1/724098 |
| 9,868,393 B2 | 1/2018 | Bahgat et al. | |
| 9,925,841 B2 | 3/2018 | Hrovat et al. | |
| 10,423,991 B1 | 9/2019 | Jeon | |
| 10,430,883 B1* | 10/2019 | Bischoff | G06Q 20/102 |
| 10,462,608 B1* | 10/2019 | Santarelli | H04W 4/029 |
| 10,664,917 B1* | 5/2020 | Wasserman | G01C 21/3685 |
| 10,672,249 B1 | 6/2020 | Balakrishnan et al. | |
| 10,732,635 B2 | 8/2020 | Haque et al. | |
| 10,745,025 B2 | 8/2020 | Kose et al. | |
| 10,948,299 B1* | 3/2021 | Zhang | G01C 21/1656 |
| 11,137,832 B2 | 10/2021 | Katz | |
| 11,361,379 B1* | 6/2022 | Rodoni | G06Q 30/0283 |
| 11,533,614 B1* | 12/2022 | Russell | B60K 35/60 |
| 2011/0307188 A1 | 12/2011 | Peng et al. | |
| 2012/0046020 A1* | 2/2012 | Tomasini | H04M 1/72463 455/418 |
| 2012/0139507 A1* | 6/2012 | Ferguson | H02M 3/158 323/234 |
| 2012/0274218 A1* | 11/2012 | Mountain | H04M 1/22 315/152 |
| 2014/0149145 A1* | 5/2014 | Peng | G06F 3/0346 702/150 |
| 2015/0363841 A1 | 12/2015 | Richie et al. | |
| 2016/0091978 A1* | 3/2016 | Park | G06F 3/017 345/156 |
| 2016/0205238 A1* | 7/2016 | Abramson | H04W 4/029 455/456.4 |
| 2017/0052028 A1* | 2/2017 | Choudhury | G01C 21/30 |
| 2017/0186054 A1 | 6/2017 | Fish et al. | |
| 2017/0220958 A1* | 8/2017 | Schucan | G06Q 10/02 |
| 2017/0265044 A1* | 9/2017 | Lundsgaard | H04W 4/027 |
| 2019/0051287 A1* | 2/2019 | Nomura | G06Q 30/0269 |
| 2019/0075201 A1* | 3/2019 | Tu | H04W 4/026 |
| 2019/0075426 A1* | 3/2019 | Nomura | G06Q 30/0269 |
| 2019/0102840 A1* | 4/2019 | Perl | G06Q 40/08 |
| 2019/0109843 A1* | 4/2019 | Kimsey-Lin | H04L 63/0853 |
| 2020/0200920 A1* | 6/2020 | Irish | G01C 21/3438 |
| 2020/0239982 A1 | 7/2020 | Yang et al. | |
| 2020/0252744 A1* | 8/2020 | Kaneichi | G08G 1/127 |
| 2020/0265474 A1 | 8/2020 | Brown et al. | |
| 2020/0363807 A1 | 11/2020 | Haque et al. | |
| 2021/0048541 A1* | 2/2021 | Miller | G01S 19/43 |
| 2021/0142419 A1* | 5/2021 | Davis | G06Q 30/0207 |

FOREIGN PATENT DOCUMENTS

| | | |
|---|---|---|
| CN | 110869807 A | 3/2020 |
| CN | 111179578 A | 5/2020 |
| CN | 210634476 U | 5/2020 |
| EP | 3462403 A1 | 4/2019 |
| WO | 2019119597 A1 | 6/2019 |

OTHER PUBLICATIONS

J. Wahlström, I. Skog and P. Händel, "Smartphone-Based Vehicle Telematics: A Ten-Year Anniversary," in IEEE Transactions on Intelligent Transportation Systems, vol. 18, No. 10, pp. 2802-2825, Oct. 2017, doi: 10.1109/TITS.2017.2680468.

Cambridge Mobile Telematics; "We make roads safer by making drivers better."; Date downloaded Nov. 16, 2020; https://www.cmtelematics.com.

B. Wallace, M. Rockwood, R. Goubran, F. Knoefel, S, Marshall, and M. Porter, "Measurement of vehicle acceleration in studies of older drivers from GPS position and OBDII velocity sensors", 2015 IEEE International Symposium on Medical Measurements and Applications (MeMA) Proceedings, Turin, Italy, 2015, pp. 391-396.

U.S. Appl. No. 16/820,528, filed Sep. 28, 2023, Office Action.
U.S. Appl. No. 16/820,528, filed Jan. 17, 2024, Office Action.
U.S. Appl. No. 16/820,528, May 9, 2024, Office Action.
U.S. Appl. No. 16/820,528, Aug. 21, 2024, Notice of Allowance.

* cited by examiner

DETECTING HANDHELD DEVICE MOVEMENTS UTILIZING A HANDHELD-MOVEMENT-DETECTION MODEL

BACKGROUND

In recent years, on-demand ride sharing systems have increasingly utilized web and mobile applications to manage real-time on-demand transportation requests. For instance, an on-demand ride sharing system matches provider devices with requester devices to provide transportation to a requester between locations. Many on-demand ride sharing systems communicate with providers that have access to a mobile device (as a provider device) to fulfill transportation requests. Some conventional systems monitor and process data from such mobile devices to detect usage of the mobile devices within a moving vehicle and other motions of such a moving vehicle while transporting a person to a destination. Although conventional systems attempt to detect such movements and driving behaviors, these systems often apply rigid detection algorithms that cannot accurately or efficiency identify mobile-device usage and driving behaviors from the mobile-device data. In particular, many conventional systems fail to distinguish between vehicle movements and mobile-device movements (independent of a moving vehicle) or to identify particular types of mobile-device movements or driving behaviors from mobile-device data.

SUMMARY

This disclosure describes one or more embodiments of methods, non-transitory computer-readable media, and systems that solve the foregoing problems in addition to providing other benefits. In particular, the disclosed systems can utilize a handheld-movement-detection model to detect whether a computing device is moved by hand or otherwise by a person within a vehicle. For instance, the disclosed systems can receive movement data from a computing device and generate filtered signals indicating device movement. Subsequently, the disclosed systems can utilize the handheld-movement-detection model to convert the filtered signals into a binary movement-classification signal based on a signal threshold. When the filtered signals satisfy the threshold signal, the disclosed systems can flag the binary movement-classification signal to indicate that the computing device has been moved by hand or otherwise by a person as opposed to other vehicular events that move the computing device. Furthermore, the disclosed systems can also utilize movement data from a computing device to detect whether the computing device is mounted or otherwise secured to a vehicle or to detect vehicular movements, such as acceleration events, cornering events, or braking events.

In some cases, the disclosed systems can configure (or adjust) parameters of the handheld-movement-detection model by utilizing movement data from a computing device that is secured to a vehicle and movement data of a computing device that is moveable within the vehicle. For instance, the disclosed systems can attribute the movement data from the secured computing device as ground truth data for movement within a vehicle. The disclosed systems can subsequently identify movement-data deviations between the movement data of the secured computing device and the moveable computing device. Based on the movement-data deviations, the disclosed systems can provide tools to configure (or adjust) parameters (e.g., signal threshold) of the handheld-movement-detection model.

BRIEF DESCRIPTION OF THE DRAWINGS

The detailed description is described with reference to the accompanying drawings in which.

DETAILED DESCRIPTION

Figure 1:
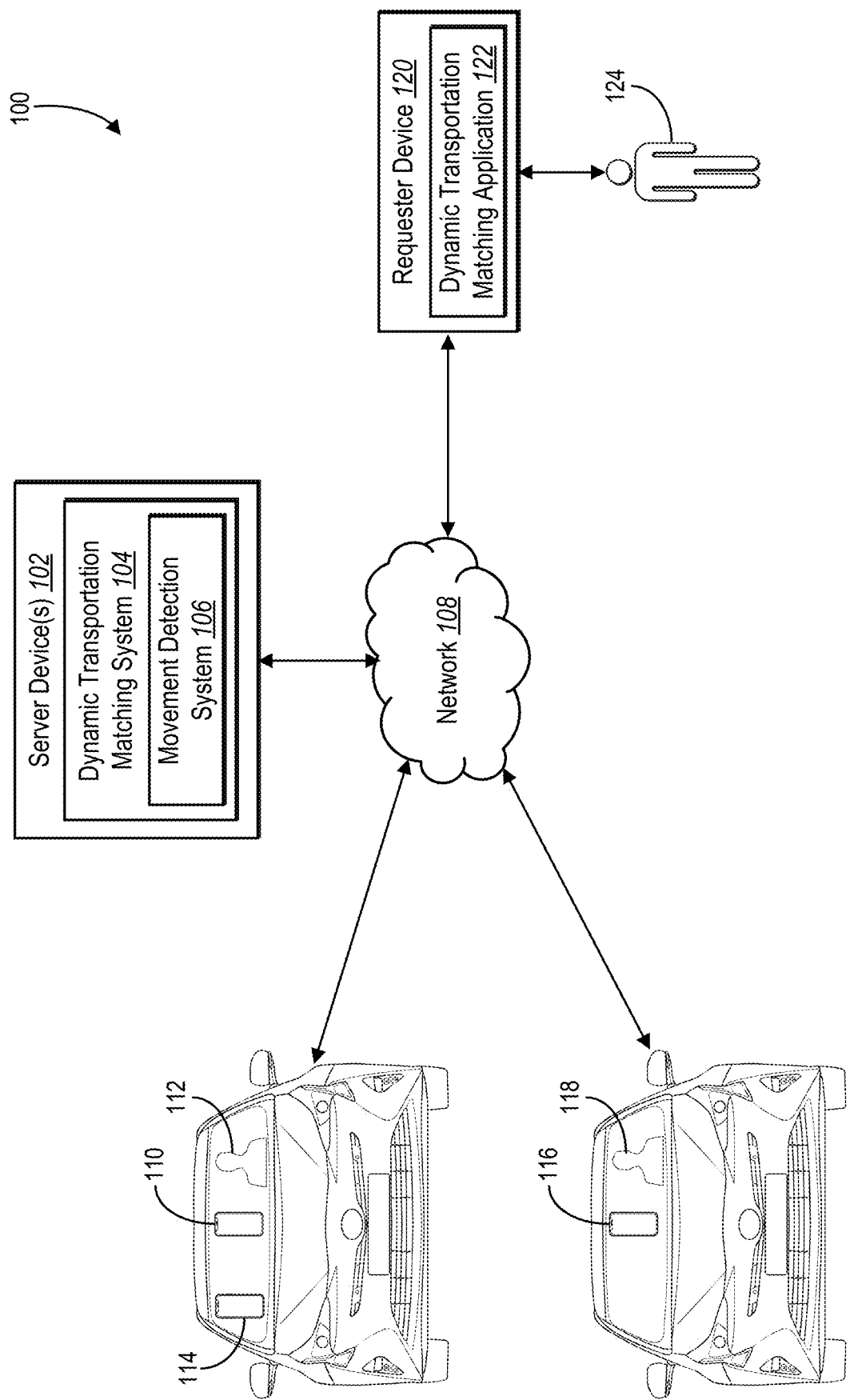
FIG. 1 illustrates a block diagram of an environment for implementing a movement detection system in accordance with one or more embodiments.

This disclosure describes a movement detection system that can detect whether a computing device is moved by hand or otherwise by a person within a vehicle. In particular, the movement detection system can receive movement data from a computing device that is within a moving or otherwise operational vehicle. Furthermore, the movement detection system can utilize a handheld-movement-detection model to generate filtered signals that indicate device movement from the movement data. Subsequently, the movement detection system can utilize the handheld-movement-detection model to convert the filtered signals into a movement-classification signal based on signal thresholds from the handheld-movement-detection model. For instance, the movement detection system can detect a handheld movement of the computing device (e.g., handheld movements of the computing device) based on the movement-classification signal.

As mentioned above, the movement detection system can receive movement data from a computing device. In one or more embodiments, the movement detection system receives movement data, such as accelerometer data and gyroscope data, that accounts for both movement of the computing device and vehicle movements experienced by the computing device while in a moving or otherwise operational vehicle (e.g., a vehicle that is being used to fulfill a transportation request). Indeed, oftentimes, computing devices record (or track) movement data that may be attributable to both movements of the computing device and movements of the operational vehicle. In such instances, the movement detection system can utilize the handheld-movement-detection model to accurately and easily detect handheld movements even when the computing-device-movement data is partly attributable to vehicle movements.

In particular, the movement detection system can utilize the handheld-movement-detection model to filter movement data that is received from a computing device to generate filtered signals for various time periods. In certain embodiments, the movement detection system applies a variety of filters and/or signal modifications (e.g., high-pass/low-pass filters, multiplication-based amplifying, square-based amplifying) to the computing-device-movement data to generate filtered signals. As an example, the movement detection system can filter the movement data to generate filtered variance signals indicating device movement. Such filtered variance signals can indicate, for instance, rapidly changing, high magnitude movements of the computing device.

After generating filtered signals, the movement detection system can utilize the handheld-movement-detection model to convert filtered signals into a movement-classification signal based on signal thresholds from the handheld-movement-detection model. For instance, the movement detection system can utilize signal thresholds that indicate computing device movements that are attributable to handheld movement rather than vehicle movement. In particular, the movement detection system can compare the filtered signals (from the movement data) to the signal thresholds to determine the movement-classification signal as a binary signal. Such a binary signal can indicate a handheld movement of the computing device or no handheld movement of the computing device (e.g., during a given time period).

In some embodiments, in addition to detecting the presence of handheld movement, the movement detection system also utilizes computing-device-movement data to detect whether the computing device is mounted or otherwise secured to a vehicle (e.g., on a dashboard or windshield) and/or to detect vehicle movements, such as acceleration events, cornering events, and/or braking events. For instance, the movement detection system can utilize the movement data to determine a pose estimation of a computing device to identify a pose or orientation corresponding to the computing device. In addition, the movement detection system can determine whether a computing device is mounted within a vehicle.

Upon determining that the computing device is mounted within or otherwise secured to the vehicle, the movement detection system can also utilize the movement data (e.g., Global Positioning System (GPS) data, accelerometer data, gyroscope data, gravity-based characteristics) to determine vehicle movements, such as acceleration events, braking events, and/or cornering events via the computing device. In some embodiments, the movement detection system also provides, for display, graphical user interfaces to notify a provider of detected handheld movements or vehicle movements (e.g., harsh braking and/or cornering) and/or map-based graphical user interfaces that indicate markers for detected acceleration, braking, or cornering events of a vehicle.

As indicated above, the movement detection system can also adjust parameters of a handheld-movement-detection model to more accurately detect handheld movements of computing devices. For example, the movement detection system can receive movement data from a computing device that is secured to a vehicle (i.e., a secured device) such that the movement data is attributable to vehicle movement. In addition, the movement detection system can also receive movement data from a computing device (e.g., a provider device) that is moveable from the vehicle (i.e., a moveable device). Subsequently, the movement detection system can determine deviations between the movement data from the secured device and the movement data from the moveable device. Based on the deviations, the movement detection system can adjust parameters of the handheld-movement-detection model (e.g., signal thresholds).

In particular, in some embodiments, the movement detection system receives movement data from a secured device and movement data from a moveable device for a time period from within the same vehicle. By receiving movement data from both the secured device and the moveable device, the movement detection system can utilize the movement data from the secured device as ground truth data that corresponds to the absence of handheld movement. Indeed, the movement detection system can compare the movement data from the secured device (e.g., the ground truth data) and the movement data from the moveable device to determine deviations between the movements experienced by both devices.

Using the determined deviations, the movement detection system can adjust parameters of a handheld-movement-detection model. For example, the movement detection system can provide the determined deviations within a graphical user interface and receive human input (e.g., via input tools within a user interface) to adjust (or configure) parameters of the handheld-movement-detection model. In some embodiments, the movement detection system can receive adjustments for the signal thresholds of the handheld-movement-detection model (e.g., via user selections of selectable options of or text input within a graphical user interface). In certain embodiments, the movement detection system can also utilize an objective function to improve an accuracy or recall of the handheld-movement-detection model. For instance, the movement detection system can utilize an objective function that adjusts parameters of the handheld-movement-detection model to improve the accuracy or recall of handheld movements detected by the handheld-movement-detection model by comparing (i) the movement data of the movable device to (ii) the determined movement data deviations between the moveable device and the secured device.

As mentioned above, conventional on-demand transportation systems often face a number of disadvantages, especially with regard to accuracy, flexibility, and efficiency. For example, conventional on-demand transportation systems often inaccurately detect handheld movements of computing devices that are within moving or otherwise operational vehicles. To determine (or detect) handheld movements of computing devices, conventional systems often correlate changes in movement data of a computing device directly to handheld movements of the computing device. However, in certain instances, computing devices record (or track) movement data that may be attributable to both movements of the computing device and movements to the computing device caused by motion of a vehicle. Accordingly, conventional systems often detect handheld movements of computing devices that are false positive detections (e.g., caused by vehicle motion rather than handheld movement of the computing device).

In addition to such false detections, conventional on-demand ride sharing systems also often inaccurately determine a placement of a computing device and/or fail to distinguish between vehicle movements (e.g., braking, acceleration, and braking behaviors) and movements by a computing device within a vehicle. For example, conventional systems often inaccurately detect an orientation of a computing device while it is in an operation vehicle. In particular, the conventional systems often fail to accurately detect a placement or orientation of a computing device within a vehicle due to the various external forces that are read by the computing device (e.g., vehicle movements, handheld movements). In some instances, conventional systems also attempt to generalize or approximate vehicle movement based on movement tracked by the computing device. These conventional systems are only capable of detecting broad-level estimates of vehicle movement but cannot use the device movement readings for more detailed applications because of inconsistencies between movements of the device and the vehicle and human influence on the computing devices (e.g., handheld movements).

Independent of inconsistently distinguishing between device and vehicle movements, many conventional on-demand ride sharing systems cannot easily detect handheld movements of a computing device while the computing device is within a moving or otherwise operational vehicle. As mentioned above, many conventional systems cannot accurately identify a type of movement from a computing device within a moving or otherwise operational vehicle due to the presence of both vehicle motion and handheld motion of the computing device. Accordingly, many conventional systems rely on identifying usage of the computing device (e.g., interacting with applications in the computing device) to detect handheld motion. Indeed, such conventional systems' ability to detect handheld movements is often limited to the access rights of the conventional on-demand ride sharing system on the computing device. For example, the conventional on-demand ride sharing system often cannot track computing device usage outside the on-demand transportation system application.

In addition to the inaccuracies and rigidness, conventional on-demand ride sharing systems often inefficiently utilize computational resources to detect handheld movements and/or other movements from computing device readings of movement data. As mentioned above, some conventional on-demand ride sharing systems track additional usage within computing devices to enable detection of handheld movements. For example, convention systems sometimes track (or receive indications of) lock-screen interactions (e.g., detected unlocks of a mobile device via code or biometrics), accessing and/or interacting with one or more applications within the mobile device (e.g., a media application, map application, camera application), or detecting user inputs (e.g., touch inputs, scrolling). In addition, many conventional on-demand ride sharing systems also identify and communicate with a large number (e.g., thousands or millions) of computing devices. By having to track (or process) the above-mentioned additional usage of computing devices to detect handheld movements for a large scale of devices, these conventional systems often utilize excessive processing resources (e.g., power, memory, and network bandwidth) and time to analyze both movement data and device usage data for handheld movement detection.

As suggested above, the disclosed movement detection system provides several advantages and benefits over conventional on-demand ride sharing systems. For instance, the movement detection system improves the accuracy with which models detect handheld (or other human) movements of computing devices within vehicles. In contrast to conventional systems that result in false positive detections caused by vehicle motion rather than handheld movement, the movement detection system accurately detects handheld movements—despite vehicle motion. As an example, by utilizing movement data to generate filtered signals and converting the filtered signals using a signal threshold—that is configured based on deviations between a secured device and a moveable device—the movement detection system can accurately identify handheld movements even when the movement data of a computing device reflects a vehicle's motion. In some embodiments, the movement detection system performs an ordered combination of actions using unique rules to detect and distinguish handheld movements of a computing device from vehicular movements reflected in the computing device's motion data.

Independent of detecting handheld movements, the movement detection system can accurately determine an orientation of a computing device and utilize movement data from the computing device to detect vehicle movements. For example, by first detecting a handheld movement and removing movement data (or signals) corresponding to the handheld movement, the movement detection system can more accurately determine a computing device orientation (e.g., whether the computing device is mounted or otherwise secured) using pose estimation. Furthermore, the movement detection system can also improve the accuracy of detecting vehicle movements. Indeed, unlike conventional systems that often only detect broad-level estimations of vehicle movement, the movement detection system utilizes movement data, such as accelerometer data, gyroscope data, and gravity-based characteristics, in combination with detected handheld movements and pose estimations to accurately detect and classify vehicle movements.

As mentioned above, the movement detection system can utilize movement-data readings from computing devices to accurately detect handheld movements and a variety of vehicle movements. Accordingly, in contrast to conventional systems that often cannot rely on movement-data readings to distinguish such movements, the movement detection system can detect a flexible range of both device movements and vehicle movements based on accelerometer, gyroscope, or other movement data from a computing device. Indeed, the movement detection system can detect computing device handheld movements, computing device orientations, and vehicle movements in a variety of situations even when the computing device is experiencing both movement of the computing device and vehicle motion. For example, the movement detection system can easily utilize sensor data (e.g., a gyroscope and accelerometer sensor) of a computing device to detect and distinguish handheld movements of a computing device from vehicular movements experienced by the computing device. As an additional example, the movement detection system can also detect a range of vehicular movements by utilizing sensor data of a computing data (e.g., the same sensor data used for handheld movement detection).

In addition to accuracy and flexibility, the movement detection system is also efficient. By detecting handheld movements of computing devices, computing device orientations, and vehicle movements based on movement data readings from the computing device, the movement detection system utilizes less computational resources. For instance, unlike conventional systems that rely on computing-device-usage information of other applications on the device, the movement detection system can utilize movement data without having to track additional usage or endanger the data security of computing devices to detect handheld movements. Unlike conventional systems, in some embodiments, the disclosed movement detect system need not receive data indications of lock-screen interactions, interactions with mobile applications, touch inputs, scrolling, or other additional device usage to detect handheld movements of a computing device. By utilizing movement data transmissions from a computing device to accurately detect such computing device movements and/or vehicle movements, the movement detection system can utilize less processing resources (e.g., power, memory, and network bandwidth) and time compared to conventional systems.

In some embodiments, one or more sensory devices associated with a computing device are integral to the movement detection system. For instance, in some cases, the movement detection system relies on a GPS receiver, an accelerometer, and a gyroscope associated with a computing device to receive movement data (relative to both the computing device itself as well as a vehicle) to detect handheld movements, computing device orientation, and/or vehicle movements. In certain embodiments, the movement detection system further relies on these sensory devices from both a computing device that is moveable and a computing device that is secured to a vehicle to identify movement data deviations and to adjust parameters of a handheld-movement-detection model based on the movement data deviations.

As indicated by the foregoing discussion, the present disclosure utilizes a variety of terms to describe features and advantages of the movement detection system. For example, as used herein, the term "movement data" (sometimes referred to as "motion data" or "telematics data") refers to information that indicates movement of a computing device (e.g., a provider device). In some embodiments, movement data includes readings or data from sensory devices (or components) of a computing device. For example, in some cases, movement data includes readings or data from an inertial measurement unit (IMU), an accelerometer, a gyroscope, a GPS unit, and/or a magnetometer.

The movement detection system can receive movement data from an accelerometer corresponding to a computing device that indicates acceleration forces experienced by the computing device. Furthermore, the movement detection system can receive movement data from a gyroscope corresponding to a computing device that indicates rotations experienced by the computing device (e.g., based on changes in a set of axes of a provider device). Such a set of axes can include three-dimensional axes (e.g., an x-axis, a y-axis, and a z-axis) that define a pose or frame of reference for a computing device. In addition, the movement detection system can receive movement data from a GPS unit corresponding to a computing device that indicates a location of the computing device (e.g., in terms of GPS coordinates or other GPS data such as speed data).

As used herein, the term "vehicle" (sometimes referred to as "transportation vehicle") refers to a car, truck, cycle (e.g., motorcycle, scooter, bicycle), or other motorized vehicle utilized for transporting passengers (e.g., requesters) and/or transporting products (e.g., food delivery, package/mail delivery). In some embodiments, a computing device secured to a vehicle (i.e., a secured device) includes a computing device (e.g., a mobile device, an in-vehicle-display device, or an onboard computer device as described in relation to FIGS. 16 and 17) that is mounted, fastened, and/or integrated on or within a vehicle such that the computing device experiences movements primarily caused by vehicle motion. Furthermore, a computing device moveable from a vehicle (i.e., a moveable device) includes a computing device (e.g., a mobile device or other provider device as described in relation to FIGS. 16 and 17) that is capable of moving through human influence (e.g., a smartphone that is operated by a transportation provider within a vehicle).

As used herein, the term "handheld-movement-detection model" refers to an algorithm or set of parameters utilized to analyze movement data to detect various movement (or position) behaviors in relation to a computing device. In particular, the handheld-movement-detection model can utilize an algorithm that (when executed by a device) generates signals (e.g., filtered signals) from movement data and converts the signals into movement-classification signals that indicate the presence or absence of handheld movement—based on a set of parameters (e.g., rules or heuristics). As used herein, the term "parameter" refers to rules and/or heuristics that represent signal thresholds that indicate (or trigger an identification of) a device movement that is attributable to handheld movement (e.g., from human influence). As an example, a parameter can include a signal threshold. In some embodiments, the movement detection system utilizes a variety of (or various combinations of) signal thresholds, such as, but not limited to, variance thresholds, accelerometer-signal thresholds, gyroscope-signal thresholds (or rotation-signal thresholds), hysteretic signal thresholds, maximum accelerometer thresholds, and/or maximum rotation (gyroscope) thresholds.

As used herein, the term "signal threshold" refers to a value (or metric) corresponding to a signal that represents a signal magnitude (or intensity) that must be satisfied to trigger a condition. In particular, a signal threshold can include a signal magnitude (or intensity) that must be satisfied to trigger a movement classification (e.g., flag a handheld movement during a time period). As an example, the movement detection system can determine that a filtered signal satisfies a signal threshold (e.g., the filtered signal meets or exceeds a signal threshold) and, as a result, flag a movement-classification signal to indicate a handheld movement of a computing device. For instance, a signal threshold can include, but is not limited to, a variance threshold, an accelerometer-signal threshold, a gyroscope-signal threshold (or rotation-signal threshold), a hysteretic signal threshold, and/or a maximum accelerometer threshold.

As used herein, the term "signal" refers to data (or set of data) that represents movement data (e.g., raw movement data). In particular, a signal (or filtered signal) can include data that is created utilizing a function to represent movement behaviors (e.g., flags and/or indicates device movement) from movement data (e.g., raw movement data). As an example, signals can include filtered variance signals, accelerometer signals, and/or rotation signals. For instance, as used herein, the term "filtered variance signal" refers to a signal that indicates device-movement variances. In particular, a filtered variance signal can indicate a changing set of data that fluctuates in terms of magnitude indicating movements of a provider device from the movement data.

As used herein, the term "movement-classification signal" refers to an indicator or label that classifies data into a type or presence of a movement. In particular, a movement-classification signal can refer to data that flags (or signals) the presence or absence of a handheld movement of a computing device for a period of time. For example, a movement-classification signal can include a binary signal (or Boolean) that indicates a handheld movement of a provider device or no handheld movement of the provider device during a time period. In some instances, the movement detection system sets a movement-classification signal as "true" or "1" when the filtered signals indicate a handheld movement of a provider device during a time period or to "false" or "0" when the filtered signals indicate no handheld movement of the provider device during a time period (or vice versa).

As used herein, the term "handheld movement" refers to a movement of a computing device (e.g., provider device) that is caused by human interaction with the computing device. For instance, a handheld movement can include a movement of a provider device caused by a human picking up the provider device, using the provider device, and/or holding the provider device. Indeed, as an example, a handheld movement can include movement behavior of a provider device having characteristics akin to when a human picks up, moves, or holds a mobile device.

As used herein, the term "orientation" refers to a pose or a frame of reference of an object relative to another object or relative to a set of axes. In particular, the orientation of a provider device can include a pose or frame of reference of a provider device relative to another object (e.g., a human or a specific point within a vehicle such as a driver's seat) or relative to three-dimensional axes (e.g., an x-axis, a y-axis, and a z-axis). For instance, the movement detection system can determine an orientation of a computing device by estimating coordinates or degrees of the computing device relative to three-dimensional axes for a vehicle. Indeed, the movement detection system can utilize a determined orientation of a provider device to identify which way a screen of the provider device is facing. In some embodiments, the movement detection system utilizes a determined orientation of a provider device to determine whether a provider device is mounted within or otherwise secured to a vehicle.

As used herein, the term "vehicle movement" refers to a movement, series of movements, or motion behavior of a vehicle. For instance, vehicle movement can include movement, series of movement, or motion behavior of a vehicle that is caused by operation of the vehicle (e.g., human driving behavior or autonomous driving behavior). As an example, vehicle movement can include acceleration events, braking events, or cornering events.

Turning now to the figures, FIG. 1 illustrates a schematic diagram of a system 100 (or environment) in which a movement detection system 106 can operate in accordance with one or more embodiments. As shown in FIG. 1, the system 100 includes server device(s) 102 (which includes dynamic transportation matching system 104 and movement detection system 106), provider devices 110 and 116, a computing device secured to a vehicle (e.g., secured device 114), a requester device 120, and network 108. As further illustrated in FIG. 1, the server device(s) 102, the provider devices 110 and 116, the secured device 114, and the requester device 120 can communicate via the network 108. Although FIG. 1 illustrates the movement detection system 106 being implemented by a particular component and/or device within the system 100, the movement detection system 106 can be implemented, in whole or in part, by other computing devices and/or components in the system 100.

As shown in FIG. 1, the server device(s) 102 can include the dynamic transportation matching system 104. In one or more embodiments, the dynamic transportation matching system 104 identifies one or more matches between transportation requests from requester devices and provider devices. In particular, the dynamic transportation matching system 104 can provide transportation requests from requester devices to provider devices that fulfill the transportation requests (e.g., transport a requester associated with the requester device to a destination location).

As also shown in FIG. 1, the dynamic transportation matching system 104 further includes the movement detection system 106. In certain instances, the movement detection system 106 can receive movement data from a provider device (e.g., provider devices 110 and 116) and utilize a handheld-movement-detection model to detect handheld movements of the provider device. In addition, the movement detection system 106 can also receive movement data from the secured device 114 and the provider device 110 to determine deviations between the movement data and to configure (or adjust) parameters of the handheld-movement-detection model in accordance with one or more embodiments. Furthermore, the movement detection system 106 can also utilize movement data corresponding to a provider device (e.g., provider devices 110 and 116) to determine an orientation of the provider device (e.g., to determine whether the provider device is mounted or otherwise secured) and/or to detect vehicle movements of the vehicle associated with the provider device in accordance with one or more embodiments.

As mentioned above and as shown in FIG. 1, the system 100 includes the provider devices 110 and 116. In one or more embodiments, the provider devices 110 and 116 may include, but are not limited to, mobile devices (e.g., smartphones, tablets) or other type of computing devices, including those explained below with reference to FIGS. 16 and/or 17. Indeed, the provider devices 110 and 116 can include computing devices associated with (and/or operated by) providers 112 and 118, respectively, or transportation vehicles (e.g., transportation vehicles of providers or autonomous vehicles). Moreover, the system 100 can include a different number of provider devices.

In addition, in reference to FIG. 1, each of the provider devices 110 and 116 can include dynamic transportation matching applications. In some embodiments, the dynamic transportation matching applications can include instructions that (upon execution) cause the provider devices 110 and 116 to perform various actions. Such instructions may cause a provider device to present dispatch instructions (e.g., via a graphical user interface displaying navigation information) for a vehicle associated with the provider device. Furthermore, such instructions may likewise cause a provider device to identify (or transmit) movement data of a provider device and/or present a graphical user interface to display notifications associated to detected handheld movements, vehicle movements, and/or provider device orientations.

As illustrated in FIG. 1, the system 100 includes, within a vehicle, the secured device 114 and the provider device 110. Indeed, the secured device 114 can include, but is not limited to, a mobile device (e.g., smartphones, tablets), in-vehicle-display device, or another type of computing device, including those explained below with reference to FIGS. 16 and/or 17. Furthermore, the secured device 114 can be secured to (e.g., mounted, fixated, integrated) the vehicle associated with the provider device 110. As previously mentioned, by doing so, the movement detection system 106 can attribute movement data of the secured device 114 mainly to vehicle movement (or motion). In addition, the movement detection system 106 can determine deviations between the movement data from the secured device 114 and the movement data of the provider device 110 (which may experience movement from both vehicle motion and human influence) in accordance with one or more embodiments. Then, the movement detection system 106 can utilize these deviations to adjust parameters of a handheld-movement-detection model in accordance with one or more embodiments.

Moreover, as shown in FIG. 1, the system 100 includes the requester device 120. For example, the requester device 120 may include, but is not limited to, a mobile device (e.g., smartphones, tablets) or another type of computing device, including those explained below with reference to FIGS. 16 and/or 17. Additionally, the requester device 120 can include a computing device associated with (and/or operated by) a requester 124 for transportation requests (or other services). As also shown in FIG. 1, the requester device 120 includes a dynamic transportation matching application 122, which can include instructions that (upon execution) cause the requester device 120 to perform various actions. For example, a requester 124 can interact with the dynamic transportation matching application 122 on the requester device 120 to transmit a transportation request to the movement detection system 106 (via the network 108). Moreover, the system 100 can include a different number of requester devices.

In one or more embodiments, the provider devices 110 and 116 and the requester device 120 correspond to one or more user accounts (e.g., user accounts stored at the server device(s) 102). For example, a requester of a requester device can establish a requester account with login credentials and the provider of the provider device can establish a provider account with login credentials. These user accounts can include a variety of information regarding requesters/providers, including requester/provider information (e.g., name, telephone number), vehicle information (e.g., vehicle type, license plate number), device information (e.g., operating system, memory or processing capability), payment information, purchase history, transportation history. Different accounts can also include various privileges associated with requesters and providers (e.g., privileges to access certain functionality via the transportation matching application, to provide transportation services, to submit transportation requests). The dynamic transportation matching system 104 can manage the provider devices 110 and 116 and the requester device 120 based on appropriate privileges associated with the corresponding user accounts (e.g. provider accounts and/or requester accounts). Accordingly, providers and/or requesters can utilize multiple devices (e.g., multiple provider devices or multiple requester devices) with the appropriate privileges associated with the corresponding accounts.

The present disclosure utilizes provider devices and requester devices to refer to devices associated with these user accounts. Thus, in referring to a provider device or a requester device, the disclosure and the claims are not limited to communications with a specific device, but any device corresponding to an account of a particular user. Accordingly, in using the term provider device, this disclosure can refer to any computing device corresponding to a provider account. Similarly, in using the term requester device, this disclosure can refer to any computing device corresponding to a requester account.

In one or more embodiments, the requester device 120 can transmit a transportation request (e.g., including a pickup location and destination location) to the dynamic transportation matching system 104. Furthermore, the dynamic transportation matching system 104 can utilize information corresponding to the transportation request and the provider devices 110 and 116 to select a provider device for the transportation request. Then, the dynamic transportation matching system 104 can transmit the transportation request to a selected provider device (from the provider devices 110 and 116) to fulfill the transportation request.

Additionally, as shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIGS. 16 and/or 17. Furthermore, although FIG. 1 illustrates the server device(s) 102, the provider devices 110 and 116, the secured device 114, and the requester device 120 communicating via the network 108, the various components of the system 100 can communicate and/or interact via other methods (e.g., the server device(s) 102 and the provider devices 110 and 116 can communicate directly).

Although one or more embodiments describe receiving (or tracking) one or more sensor devices of computing devices (e.g., for movement data), in some embodiments, the dynamic transportation matching system 104 provides user preference options within a computing device (e.g., a provider device) to disable the receiving (or tracking) one or more sensor devices of the computing device. In certain implementations, the dynamic transportation matching system 104 only receives (or tracks) one or more sensor devices of the computing device with permission from a user of the computing device (via the user preference options). In some cases, even with user preference options indicating permission to receive or track the one or more sensor devices of the computing device, the dynamic transportation matching system 104 only periodically receives or tracks the one or more sensor devices of the computing device (and for detecting one or more movements in accordance with one or more embodiments). Furthermore, the dynamic transportation matching system 104 utilizes the data (e.g., movement data) from the received (or tracked) one or more sensor devices of the computing to detect one or more movements (in accordance with one or more embodiments) and deletes the data thereafter.

Figure 2:
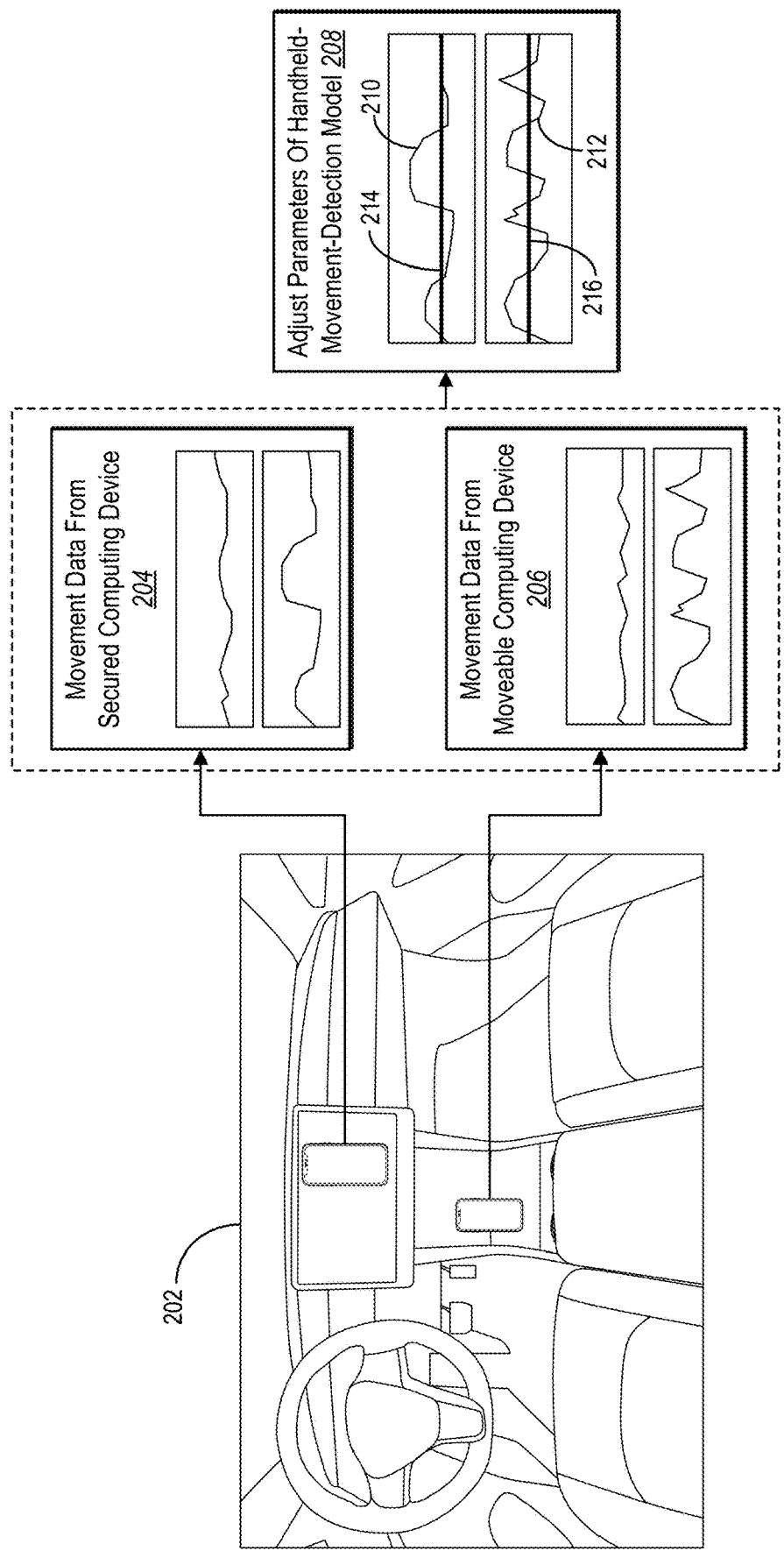
FIG. 2 illustrates a diagram of a movement detection system adjusting parameters of a handheld-movement-detection model in accordance with one or more embodiments.

As mentioned above, movement detection system 106 can adjust parameters of a handheld-movement-detection model utilizing movement data deviations. For example, FIG. 2 illustrates the movement detection system 106 adjusting (or configuring) parameters of handheld-movement-detection model utilizing movement data deviations. As shown in FIG. 2, the movement detection system 106 receives movement data from a secured computing device 204 from within a vehicle 202. Indeed, as shown in FIG. 2, the movement data from the secured computing device 204 is collected (or read) by a computing device that is secured to the vehicle 202.

In addition, as illustrated in FIG. 2, the movement detection system 106 receives movement data from a moveable computing device 206 from within the vehicle 202. Indeed, as shown in FIG. 2, the movement data from the moveable computing device 206 is collected by a computing device that is moveable from the vehicle 202. Then, in an act 208 illustrated in FIG. 2, the movement detection system 106 utilizes the movement data from the secured computing device 204 and the movement data from the moveable computing device 206 to adjust parameters of a handheld-movement-detection model. In some embodiments, the movement detection system 106 determines movement data (or filtered signal) deviations between the movement data from the secured computing device 204 and the movement data from the moveable computing device 206. Subsequently, the movement detection system 106 utilizes the movement data deviations to adjust the parameters of the handheld-movement-detection model (in the act 208).

In one or more embodiments, the movement detection system 106 receives movement data from a matching time period from both a secured device and movement data from a moveable device. More specifically, in one or more embodiments, the movement detection system 106 receives movement data that is read (or collected) in simultaneously from both a secured device and a moveable device within the same operational vehicle. Furthermore, although one or more embodiments illustrate the movement detection system 106 receiving movement data from a single pairing of a secured device and a moveable device within one vehicle, the movement detection system 106 can receive a movement data from various numbers of pairings of secured devices and moveable devices that are within various numbers of vehicles.

In some embodiments, the movement detection system 106 receives accelerometer data readings as (part of) the movement data (from a secured device and/or a moveable device). For instance, the accelerometer data readings can include accelerations of a computing device in x, y, and z directions. In addition, the movement detection system 106 can receive gyroscope data readings as (part of) the movement data (from a secured device and/or a moveable device). In one or more embodiments, the gyroscope data readings include rotational movements of a computing device relative to the computing devices three-dimensional coordinates (e.g., in x, y, and z directions). For example, the gyroscope data readings can include rotational movements that are measured in terms of angular velocity (e.g., degrees per second or revolutions per second) of a computing device. As previously mentioned, the movement detection system can also receive GPS data readings as (part of) the movement data (from a secured device and/or a moveable device). For instance, the GPS data readings can include, but is not limited to, GPS location coordinates of a computing device. The movement detection system 106 can further receive speed data from the computing device or determine a speed of the computing device based on such GPS location coordinates (e.g., a velocity measurement between multiple GPS location coordinates).

Furthermore, the movement detection system 106 can determine movement data deviations between the movement data from a secured device and movement data from a moveable device. In particular, the movement detection system 106 can determine a difference between movement data values (of the secured device and moveable device) as the movement data deviations. For instance, the movement detection system 106 can subtract movement data values corresponding to one set of movement data (e.g., of either the secured device or moveable device) from the other set of movement data. As an example, the movement detection system 106 can determine a difference between various combinations of, the accelerometer data readings, gyroscope data readings, and/or GPS data readings that correspond to a secured device and a moveable device.

In some instances, the movement detection system 106 determines deviations between the sets of movement data from a secured device and movement data from a moveable device by utilizing percentages. For instance, the movement detection system 106 can determine movement data deviations in terms of percentage of change between the movement data readings of the secured device and the moveable device (or vice versa). Additionally, in certain instance, the movement detection system 106 determines an increase and/or decrease in a ratio between movement data values of a secured device and a moveable device as the movement data deviations.

Furthermore, the movement detection system 106 can also determine deviations between filtered signals corresponding to movement data from a secured device and a moveable device. For instance, the movement detection system 106 can utilize movement data (from the secured device and moveable device) to generate filtered signals (in accordance with one or more embodiments) corresponding to the secured device and moveable device. Subsequently, the movement detection system 106 can determine filtered signal deviations between the generated filtered signals of the secured device and moveable device in accordance with one or more embodiments (e.g., a subtraction, a percentage of change, a ratio).

Additionally, in one or more embodiments, the movement detection system 106 utilizes movement data deviations and/or movement data of a secured device as ground truth data. In particular, the movement detection system 106 can utilize the movement data deviations as ground truth data to indicate a representation of the difference between movement of a computing device by vehicle motion (e.g., due to the secured device) and movement of a computing device by human influence, such as a handheld movement (e.g., due to the moveable device). In some instances, the movement detection system 106 utilizes the movement data of a secured device as ground truth data to indicate a representation of movement data readings that are attributable to vehicle motion in the absence (or absence to a negligible degree) of movements caused by human influence (e.g., handheld movements).

Furthermore, as mentioned above, the movement detection system 106 can adjust parameters of a handheld-movement-detection model by utilizing one or more of the movement data deviations (as described above). In some embodiments, the movement detection system 106 adjusts parameters of the handheld-movement-detection model by adjusting rules and/or heuristics that represent thresholds (or triggers) of the handheld-movement-detection model. For example, the thresholds (or triggers) (e.g., signal thresholds) of the handheld-movement-detection model can represent characteristics (or patterns) of movement data (or generated filtered signals of the movement data) that indicate (or correlate) with device movement that is attributable to a handheld movement (e.g., from human influence).

As suggested above, in some instances, the movement detection system 106 adjusts (or configures) the parameters of a handheld-movement-detection model by utilizing determined movement data deviations in combination with user inputs. To configure the parameters of the handheld-movement-detection model, in some embodiments, the movement detection system 106 provides, for display, a graphical user interface that includes a visual representation of movement data deviations (between one or more secured devices and a moveable devices) for analysis by a user. Indeed, in one or more embodiments, the movement detection system 106 receives user configurations (or adjustments) to parameters of a handheld-movement-detection model based on the visual representation of movement data deviations. For example, the movement detection system 106 can receive adjustments (or configurations) that set or change parameters associated with the handheld-movement-detection model.

In some embodiments, the movement detection system 106 provides, for display, a graphical user interface that includes the visual representation of the movement data deviations with input tools for adjusting (or configuring) parameters of the handheld-movement-detection model. For instance, in some embodiments, the movement detection system 106 provides input tools to receive text input (e.g., text fields) from users to configure values corresponding to the parameters of the handheld-movement-detection model (e.g., values of the signal threshold). Moreover, in one or more embodiments, the movement detection system 106 provides input tools (e.g., slider tools, drag tools) to receive adjustments (or configurations) to numerical values corresponding to the parameters of the handheld-movement-detection model.

As just indicated, the movement detection system 106 can provide input tools, such as selectable options, to drag or interact with visual indicators of the parameters of the handheld-movement-detection model. For example, the movement detection system 106 can provide, for display, a graphical user interface that includes a visual indication of the parameters of the handheld-movement-detection model in relation displayed movement data deviations. Such a visual indication may include a (signal) threshold boundary line corresponding to a parameter of the handheld-movement-detection model overlaid a graph that represents movement data deviations and/or movement data of a secured device. Furthermore, the movement detection system 106 can receive (or detect) user interactions with the input tools to drag or interact with the visual indicators of the parameters to adjust the parameters in relation to the displayed movement data deviations. For instance, the movement detection system 106 can receive a user interaction with a selectable option that places the visual representation of the parameters near a value position that represents a handheld movement according to the displayed movement data deviations (e.g., the positioning of the parameters adjusts the values corresponding to the parameters). In particular, the movement detection system 106 can receive interactions with the input tools to align the parameters with a visual demonstration of where and/or when a handheld movement is likely present according to the displayed movement data deviations.

Indeed, to adjust a parameter of the handheld-movement-detection model, the movement detection system 106 can increase and/or decrease values corresponding to the parameters of the handheld-movement-detection model. For instance, the movement detection system 106 can adjust a parameter of the handheld-movement-detection model by increasing and/or decreasing one or more values corresponding to threshold signals. In some instances, the movement detection system 106 can adjust a parameter of the handheld-movement-detection model by increasing and/or decreasing a maximum value corresponding to a maximum accelerometer reading or a maximum rotational (gyroscope) reading that indicates handheld movement versus only vehicle motion.

In some embodiments, the movement detection system 106 adjusts signal thresholds that indicate (via a value of the signal type) when a signal (e.g., a filtered signal) value represents (or correlates with) a handheld movement. As an example, the movement detection system 106 can adjust an accelerometer-signal threshold that indicates when an accelerometer signal represents a handheld movement (e.g., when a computing device acceleration correlates to handheld movement rather than vehicle movement). Indeed, the movement detection system 106 can adjust a variety of signal thresholds (e.g., an accelerometer-signal threshold, a gyroscope-signal threshold (or rotation-signal thresholds), hysteretic signal thresholds, maximum accelerometer thresholds, and/or maximum rotation thresholds) in accordance with one or more embodiments.

As shown in the act 208 depicted by FIG. 2, the movement detection system 106 utilizes an accelerometer-signal threshold 214 for accelerometer signals 210. The movement detection system 106 further utilizes a gyroscope-signal threshold 216 for gyroscope signals 212. Indeed, in one or more embodiments, the movement detection system 106 can adjust the accelerometer-signal threshold 214 and/or the gyroscope-signal threshold 216 by increasing and/or decreasing the accelerometer-signal threshold 214 and/or the gyroscope-signal threshold 216.

In one or more additional embodiments, the movement detection system 106 generates filtered signals from the movement data of a secured computing device and adjusts the parameters of a handheld-movement-detection model based on the generated filtered signals. In particular, in one or more embodiments, the movement detection system 106 utilizes the filtered signals that are generated from the movement data of the secured device as the baseline (e.g., ground truth) filtered signals that are attributable to vehicle motion rather than handheld movement for a computing device. Indeed, the movement detection system 106 can provide, for display within a graphical user interface, user input tools to adjust parameters of a handheld-movement-detection model (e.g., the signal thresholds) in relation to a displayed filtered signal that is generated from movement data of a secured device. For instance, the movement detection system 106 can receive a user input to adjust parameters (e.g., signal thresholds) of the handheld-movement-detection model to match the displayed filtered signals generated from movement data of the secured device.

In addition to generating filtered signals, in some embodiments, the movement detection system 106 also provides, for display within a graphical user interface, filtered signals from a moveable device (that relate to the filtered signals from the secured device). Indeed, the movement detection system 106 can provide, for display within a graphical user interface, both the filtered signals from the moveable device and the secured device to illustrate a difference (and/or to provide a point of reference) between the filtered signals. In addition, the movement detection system 106 can provide, for display within a graphical user interface, the illustrative difference (and/or point of reference) between the filtered signals for adjusting (or configuring) a parameter of the handheld-movement-detection model using user input tools on the graphical user interface. For instance, the movement detection system 106 displays a graphical user interface illustrating deviations between filtered signals as described below (e.g., in relation to FIGS. 9A and 9B).

As suggested above, the movement detection system 106 can configure parameters of a handheld-movement-detection model to improve recall or accuracy. In one or more embodiments, the movement detection system 106 utilizes an objective function with an objective to increase a recall and/or precision of a handheld-movement-detection model in detecting handheld movements of computing devices. For instance, the movement detection system 106 can determine a recall and/or precision of a handheld-movement-detection model based on a comparison between handheld movement detections from movement data of a moveable device (e.g., independently) and indications of handheld movement from the movement data deviations between movement data of both the moveable device and a secured device (e.g., as a ground truth).

As an example, the movement detection system 106 first utilizes movement data from a moveable device with the handheld-movement-detection model to detect handheld movements of the moveable device. In addition, the movement detection system 106 can identify instances from determined movement data deviations between the moveable device and the secured device that correlate to handheld movements (e.g., based on a user generated label). Then, the movement detection system 106 can determine a recall and/or precision of the handheld-movement-detection model by comparing the detected handheld movements from the movement data of the moveable device to the identified instances of handheld movements (e.g., to check if the detected handheld movement is corroborated by the movement data deviations).

As noted above, the movement detection system 106 can utilize a determined recall and/or precision to adjust parameters of the handheld-movement-detection model. For instance, if the determined recall and/or precision does not satisfy a threshold recall and/or precision by not detecting a sufficient number of actual handheld movements (e.g., false negatives), the movement detection system 106 can adjust parameters of the handheld-movement-detection model by decreasing signal threshold values (e.g., to introduce more sensitivity in recall by the handheld-movement-detection model). Furthermore, in some instances, if the determined recall and/or precision detects an excessive number of incorrect handheld movements (e.g., false positives), the movement detection system 106 can adjust the parameters of the handheld-movement-detection model by increasing signal threshold values (e.g., to introduce less sensitivity in recall by the handheld-movement-detection model).

Consistent with the input tools described above, the movement detection system 106 can utilize such input tools to adjust parameters of the handheld-movement-detection model based on a determined recall and/or precision. In some embodiments, for instance, the movement detection system 106 can receive user inputs (e.g., via user input tools displayed within a graphical user interface) to adjust parameters of a handheld-movement-detection model based on determined recall and/or precision. By contrast, in some embodiments, the movement detection system 106 automatically adjusts the parameters of the handheld-movement-detection model by utilizing a threshold recall and/or precision (e.g., or other approaches such as movement data deviations, baseline filtered signals generated from movement data of a secured device).

In addition to configuring a handheld-movement-detection model, the movement detection system 106 can detect handheld movements of a computing device by passing movement data from the computing device through the handheld-movement-detection model. Indeed, the movement detection system 106 can utilize the handheld-movement-detection model to detect whether a computing device is moved by hand (or otherwise by human influence). For instance, FIG. 3 illustrates an overview of the movement detection system 106 detecting handheld movements of a computing device by utilizing a handheld-movement-detection model in accordance with one or more embodiments.

Figure 3:
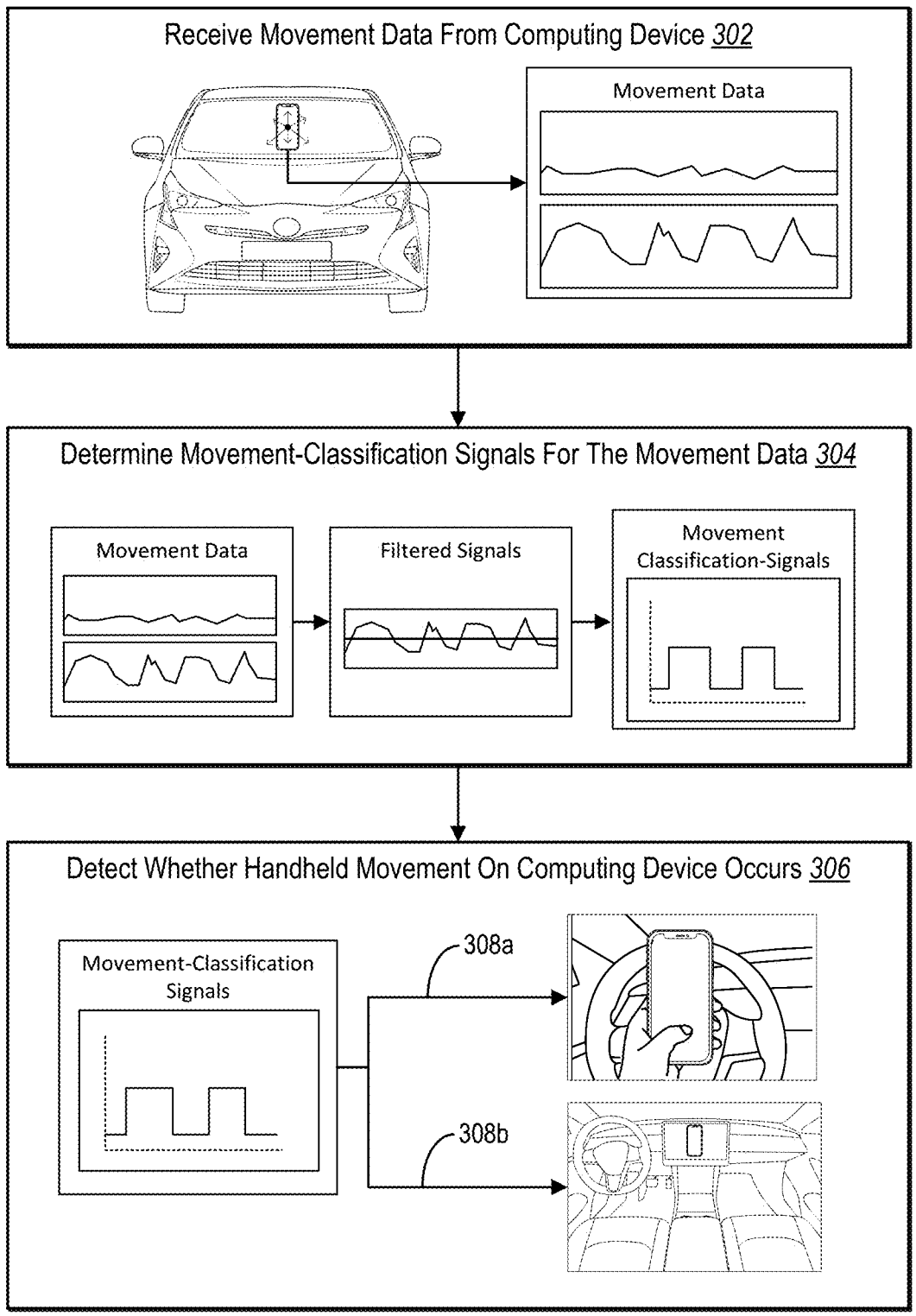
FIG. 3 illustrates an overview diagram of a movement detection system utilizing a handheld-movement-detection model to detect handheld movements from a computing device in accordance with one or more embodiments.

As shown in FIG. 3, the handheld-movement-detection model receives movement data from a computing device (e.g., provider device) in an act 302. As previously mentioned, the movement data can include, but is not limited to, accelerometer data, gyroscope (rotation) data, and/or GPS data. Indeed, the movement detection system 106 can receive movement data from a computing device in accordance with one or more embodiments herein.

As further illustrated in FIG. 3, the handheld-movement-detection model determines movement-classification signals for the movement data in an act 304. As depicted as part of the act 304, in some implementations, the movement detection system 106 utilizes the handheld-movement-detection model to generate filtered signals from the movement data and then to compare the filtered signals to signal thresholds to determine movement-classification signals for one or more periods of time. Utilizing a handheld-movement-detection model to generate filtered signals and converting the filtered signals to movement-classification signals is described in greater detail below (e.g., in relation to FIG. 5).

Moreover, as shown in FIG. 3, the movement detection system 106 detects whether handheld movement on the computing device occurs in an act 306. In particular, as shown in FIG. 3, the movement detection system 106 utilizes a movement-classification signal for a time period to detect whether a handheld movement on the computing device occurred. In one or more embodiments, the movement detection system 106 detects a handheld movement based on a binary signal of the movement-classification signal and/or detects the absence of handheld movement from the computing device (e.g., due to being mounted, placed in a dashboard, and/or secured to another location of a vehicle).

As illustrated in FIG. 3, the movement detection system 106 can detect a handheld movement 308a when the movement-classification signal indicates the presence of a handheld movement. Furthermore, as also shown in FIG. 3, the movement detection system 106 can determine an absence of a handheld movement 308b when the movement-classification signal does not indicate the presence of a handheld movement. Detecting whether a handheld movement has occurred based on a movement-classification signal is described in greater detail below (e.g., in relation to FIG. 5).

Figure 4:
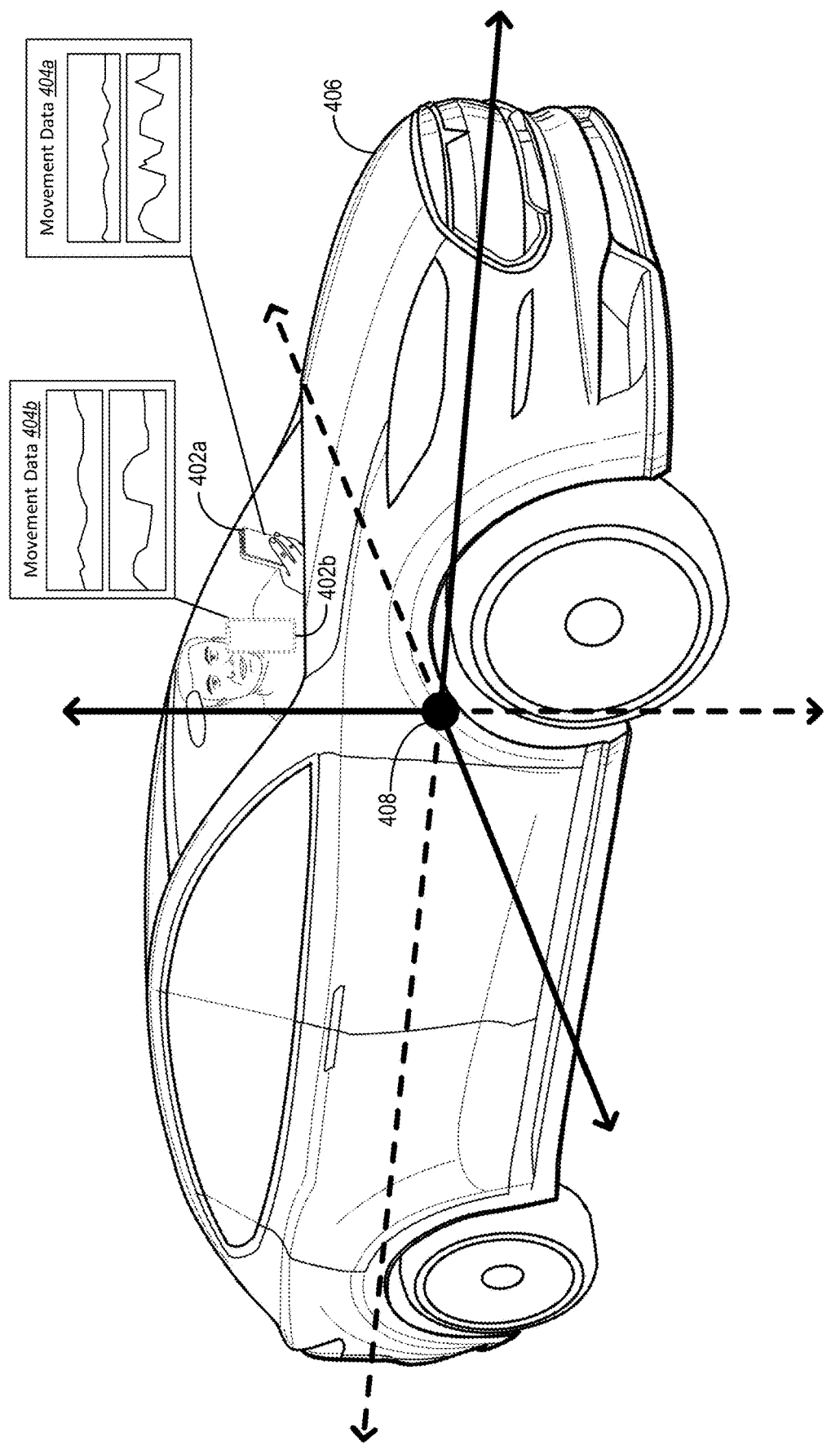
FIG. 4 illustrates an example of the movement detection system receiving movement data from one or more computing devices within a vehicle in accordance with one or more embodiments.

As mentioned above, the movement detection system 106 can receive movement data from one or both of a moveable device and a secured device. In either case, a computing device within a vehicle can generate or transmit movement data that is attributable to various combinations of handheld movement and/or vehicle motion. FIG. 4 illustrates a computing device generating (or tracking) movement data in different situations. For example, as shown in FIG. 4, a computing device 402a may experience movement from handheld movements (or human influence) and, consequently, generate (or track) movement data that is attributable to both the handheld movement and vehicle motion. Furthermore, in some instances, as shown in FIG. 4, the computing device 402b may be secured (e.g., mounted) or otherwise not experience movement from human influence (e.g., the computing device 402a when mounted or placed within the car or while not being used by a user). As shown in FIG. 4, the movement data of a computing device may result in different movement data readings or different filtered signals depending on whether it is experiencing handheld movements or not experiencing handheld movements.

As also shown by FIG. 4, within a vehicle 406, a computing device (such as computing devices 402a and 402b) can experience other forces that effect the movement data of the computing device. For instance, as illustrated in FIG. 4, the computing device 402a or 402b can experience vehicle motion along a set of vehicle axes 408 (e.g., an x-axis, a y-axis, and a z-axis of a vehicle) of the vehicle 406. The vehicle motion can include movements along the set of vehicle axes 408, such as, but not limited to, positive and/or negative accelerations (e.g., centripetal acceleration, forward-backward acceleration, up-down gravitational (or vertical) acceleration), vehicle orientations, and/or rotational movements (e.g., an angular velocity). Indeed, in one or more embodiments, the computing device 402a or 402b detects the vehicle motion along the set of vehicle axes 408, where the motion is reflected in the movement data (such as the movement data 404a or 404b).

When a computing device is within a moving or otherwise operational vehicle, the computing device may constantly experience movement regardless of handheld movement or no handheld movement. Due to the complexity and variety of forces being detected and translated into movement data when a computing device is within an operation vehicle, many conventional systems fail to detect precise movement behaviors with respect to a computing device when the computing device is within the operational vehicle. Indeed, many conventional systems often fail to accurately detect handheld movements of a computing device from movement data read on the computing device when the computing device detects movement or generates corresponding movement data that accounts for both movements via human influence and movements resulting from vehicle motion.

Although one or more embodiments illustrates the movement detection system 106 utilizing (or receiving) movement data continuously, in one or more additional embodiments, the movement detection system 106 utilizes (or receives) various types of movement data selectively. For instance, in some instances, the movement detection system 106 utilizes various combinations of movement data based on an activity state of a provider device. For instance, in some embodiments, the movement detection system 106 selectively enables (or receives data from) one or more sensor devices based on the activity state of the provider device. As an example, the movement detection system 106 can selectively receive various combinations of movement data (e.g., accelerometer data, GPS data, gyroscope data) based on whether the provider device is in an idle state, an in-transit state (e.g., traveling to a pickup location), and/or in an active-transport state (e.g., actively fulfilling a transportation request). Indeed, the movement detection system 106 can continuously receive movement data as a basis for detecting handheld movements of a computing device or selectively receive movement data (based on an activity state) as a basis for detecting handheld movements of the computing device.

Figure 5:
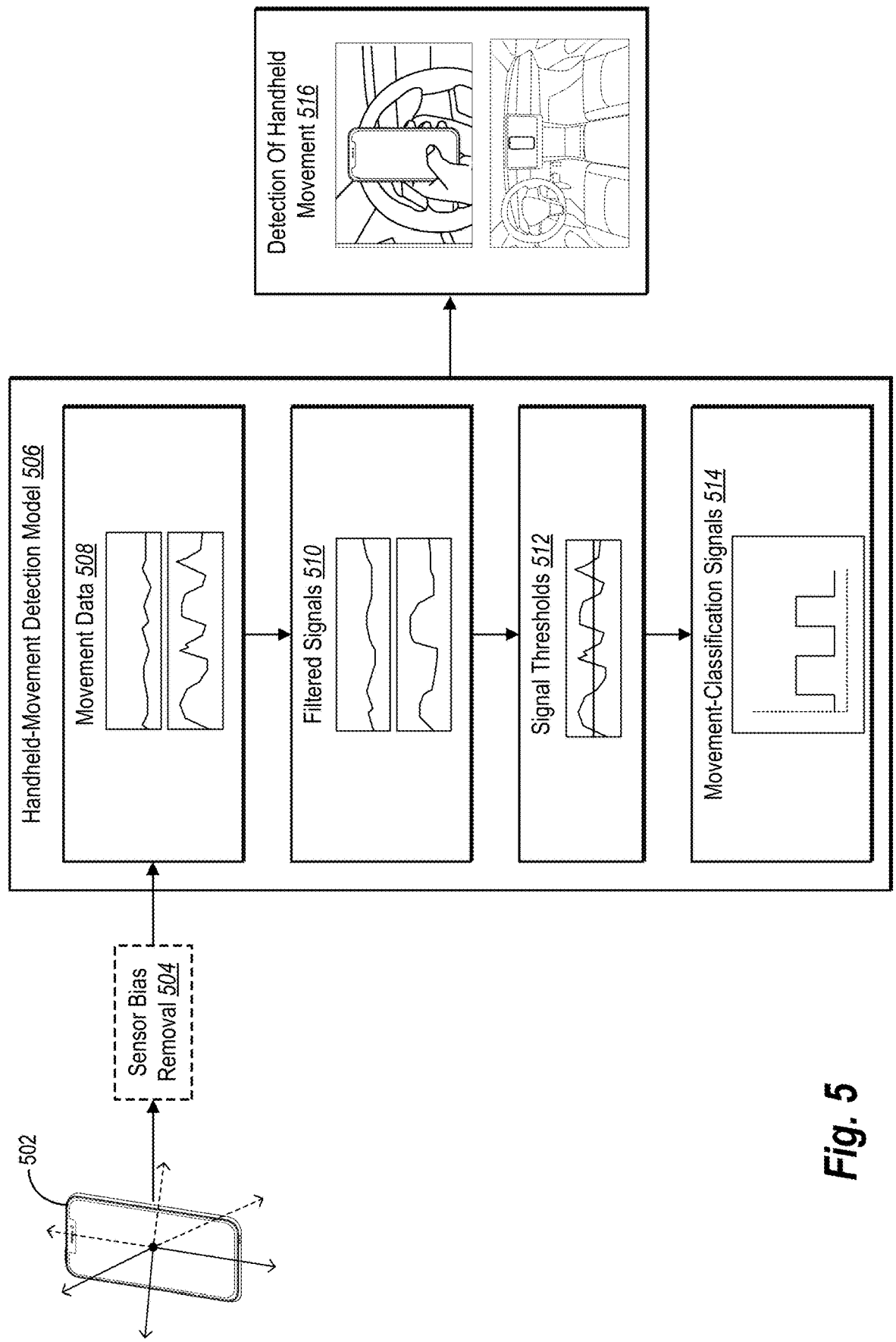
FIG. 5 illustrates a diagram of a movement detection system utilizing a handheld-movement-detection model to detect handheld movements in accordance with one or more embodiments.

As mentioned above, the movement detection system 106 can pass movement data received from a computing device (such as that depicted in FIG. 4) through a handheld-movement-detection model to detect handheld movement of the computing device (e.g., within a moving or otherwise operational vehicle). FIG. 5 illustrates the movement detection system 106 utilizing a handheld-movement-detection model to detect handheld movements, as described in more detail below. Indeed, as shown in FIG. 5, the movement detection system 106 utilizes a handheld-movement-detection model 506 to receive movement data 508 from a computing device 502, generate filtered signals 510 from the movement data 508, and utilize signal thresholds 512 to convert the filtered signals 510 into movement-classification signals 514. Then, as further illustrated in FIG. 5, the movement detection system 106 utilizes the movement-classification signals 514 to detect whether a handheld movement occurred (e.g., detection of handheld movement 516).

As shown in FIG. 5, the movement detection system 106 receives movement data 508 from a computing device 502. In particular, the movement detection system 106 can receive movement data as described above (e.g., as depicted in FIG. 4 in accordance with one or more embodiments). In some embodiments, as shown in FIG. 5, the movement detection system 106 performs sensor bias removal 504 on the movement data from the computing device 502.

To perform sensor bias removal, in some embodiments, the movement detection system 106 utilizes identified device characteristics of a computing device. For example, the movement detection system 106 can, for a computing device, identify one or more device characteristics, such as an operating system of the computing device and also hardware characteristics, such as a processor type and/or sensory device types (e.g., specific IMU units, GPS units, accelerometer units, gyroscope units). Indeed, the movement detection system 106 identify biases introduced in movement data from various combinations of computing device characteristics. In one or more embodiments, the movement detection system 106 modifies (or adjusts) the movement data to account for device characteristic specific biases.

To illustrate, in certain embodiments, the movement detection system 106 identifies known errors and/or irregularities of sensor readings (of movement data) from computing devices having specific device characteristics and/or hardware characteristics. For instance, the movement detection system 106 can identify that a given computing device with a specific set of device characteristics and/or hardware characteristics (e.g., a mobile phone of a specific manufacturer) provides sensor readings that have a consistent error rate. In some cases, a particular computing device may produce (i) acceleration data that is biased by a small portion in terms of meters per second squared or in terms of G-force, (ii) gyroscope data for velocity about an axis that is biased by a measure of degrees or portion of degrees, or (iii) GPS data that is biased in coordinates to a particular direction or axis. Using these known errors and/or irregularities of sensor readings, the movement detection system 106 can identify the known biases introduced in movement data from the various combinations of computing device characteristics and/or hardware characteristics and adjust the movement data to remove (or resolve) the sensor biases. In particular, in one or more instances, the movement detection system 106 identifies and removes sensor biases from specific computing devices to unify (or standardize) the movement data received from various combinations of computing devices. Based on a known bias, for instance, the movement detection system 106 can adjust the movement data by (i) millimeters, centimeters, or meters per second squared for acceleration, (ii) degrees or a small portion of degrees for a gyroscope rotation, or (iii) coordinates in a particular direction or with reference to a particular axis for GPS data.

By performing sensor bias removal, the movement detection system 106 can remove inconsistencies between movement data from different computing devices (e.g., standardize the movement data from multiple sources). In some instances, the movement detection system 106 can utilize sensor bias removal when receiving movement data from both secured and moveable devices (e.g., to determine movement data deviations and adjust a handheld-movement-detection model).

As further shown in FIG. 5, the movement detection system 106 utilizes the movement data 508 to generate filtered signals 510. As mentioned above, a filtered signal can represent movement behaviors of a computing device that are derived from movement data of the computing device. To generate a filtered signal, the movement detection system 106 can utilize (or apply) various functions and/or filters to obtain signals from raw movement data. In addition, the movement detection system 106 can generate filtered signals from various aspects of a set of movement data from a computing device. For instance, the movement detection system 106 can generate a variety of (filtered) signals using an application of functions and/or filters (e.g., based on heuristics and/or rules) on a set of movement data corresponding to a computing device. As an example, the movement detection system 106 can generate, but is not limited to, various combinations of (filtered) accelerometer signals, (filtered) rotational signals, and/or (filtered) variance signals).

In one or more embodiments, the movement detection system 106 generates filtered variance signals to indicate or represent data that changes in terms of magnitude indicating movements of a computing device. For instance, in some embodiments, the movement detection system 106 determines a magnitude of a set of movement data to generate filtered signals. In particular, the movement detection system 106 determines a magnitude of acceleration (e.g., from accelerometer data) and/or rotation readings (e.g., from gyroscope data) over a period of time. The magnitude of acceleration and/or rotation readings can represent a scale of each acceleration and/or rotation reading values compared to other values of the same kind. In some embodiments, the movement detection system 106 calculates a norm for the acceleration and/or rotation readings to determine the magnitude of acceleration and/or rotation readings. For instance, the movement detection system 106 can utilize a variety of approaches to determine a magnitude of acceleration and/or rotation readings including utilizing a Euclidean norm (e.g., an L2 Norm), an Absolute-value norm, and/or a p-norm.

After determining a magnitude of a set of movement data, the movement detection system 106 generates filtered signals that approximate the variance of the (magnitude of) acceleration and/or rotation readings. Indeed, the movement detection system 106 approximates the variance of the acceleration and/or rotation readings to generate filtered variance signals for the acceleration and/or rotation readings (e.g., an accelerometer-variance signal and/or a rotation-variance signal). In one or more embodiments, the movement detection system 106 utilizes the filtered variance signals to represent (or indicate) periods of times in which handheld movement of a computing device is characterized by high magnitude, rapidly changing acceleration and/or rotation.

To generate the filtered variance signals, in one or more embodiments, the movement detection system 106 applies a high-pass filter and/or a low-pass filter to the (magnitude of) acceleration and/or rotation readings. For instance, the movement detection system 106 can determine a low-pass filtered version of the (magnitude of) acceleration and/or rotation readings. Then, the movement detection system 106 can apply a high-pass filter (e.g., an approximated high-pass filter) by determining a difference between the low-pass filtered version of the acceleration and/or rotation readings from the original acceleration and/or rotation readings to generate one or more high-pass filtered signals.

In addition to filtering movement data through a high-pass filter, the movement detection system 106 can amplify the one or more high-pass filtered signals. In particular, the movement detection system 106 can amplify the one or more high-pass filtered signals by utilizing a multiplier for the signal (e.g., squaring, cubing, multiplying) the one or more high-pass filtered signals. Then, in one or more embodiments, the movement detection system 106 applies a low-pass filter to the amplified one or more high-pass filtered signals to generate filtered variance signals from movement data (e.g., the acceleration and/or rotation readings).

In one or more embodiments, the movement detection system 106 utilizes a low-pass filter that introduces smoothness to a set of movement data (or signals from the movement data) to generate the filtered variance signals. In particular, the movement detection system 106 can utilize a low-pass filter to filter noisy characteristics from a set of movement data. Indeed, in some embodiments, to generate the filtered variance signals from the movement data, the movement detection system 106 utilizes a time-domain moving average filter as the low-pass filter.

Although one or more embodiments herein illustrate the movement detection system 106 utilizing filtered variance signals from a set of movement data, the movement detection system 106 can utilize a variety of signal filtering approaches to determine filtered signals from the movement data. For instance, in one or more embodiments, the movement detection system 106 can also utilize filtering approaches to determine filtered mean signals and/or filtered co-variance signals of the movement data.

Upon determining the filtered signals 510, as shown in FIG. 5, the movement detection system 106 applies the signal thresholds 512 to the filtered signals 510. As mentioned above, a signal threshold represents a signal magnitude (or intensity) that, when satisfied, triggers the movement detection system 106 to generate a movement-classification signal (e.g., a binary signal that indicates the presence or absence of a handheld movement). In some embodiments, the movement detection system 106 compares a filtered signal (at a time period) to a signal threshold to check if signal threshold is satisfied. Indeed, at a time period where the signal threshold is satisfied, the movement detection system 106 flags the movement-classification signal as indicating a movement (e.g., a "true" value or another binary indicator).

Furthermore, because the movement-classification signal corresponds to a time period, the movement detection system 106 can identify time periods where handheld movement occurred and time periods where handheld movement did not occur. For instance, the movement detection system 106 can identify a time period in which handheld movement occurred by identifying that the time period corresponds to a movement-classification signal flagged to indicate movement (e.g., a "true" binary signal). In addition, the movement detection system 106 can identify a time period in which handheld movement has not occurred by identifying that the time period corresponds to a movement-classification signal flagged to indicate no movement (e.g., a "false" binary signal).

In some embodiments, the movement detection system 106 utilizes various signal thresholds. For instance, the movement detection system 106 can utilize a handheld-movement-detection model that includes separate thresholds for acceleration signals (e.g., threshold acceleration signals) and rotation signals (e.g., threshold rotation signals). Then, the movement detection system 106 can compare acceleration signals to acceleration signal thresholds to determine movement-classification signals for the acceleration signals. Likewise, the movement detection system 106 can also compare rotation signals to rotation-signal thresholds to determine a movement-classification signals for the rotation signal.

As further indicated by FIG. 5, the movement detection system 106 applies the signal thresholds 512 to the filtered signals 510 to generate the movement-classification signals 514. Indeed, the movement detection system 106 can flag or set a movement-classification signal as indicating movement (e.g., "true") when various combinations of filtered signals satisfy corresponding combinations of signal thresholds. For example, in some instances, the movement detection system 106 generates a movement-classification signal indicating handheld movement when each filtered signal (e.g., the filtered rotation signal and the filtered acceleration signal) satisfies its corresponding signal threshold (e.g., threshold acceleration-signal thresholds and rotation-signal thresholds). In one or more additional embodiments, the movement detection system 106 generates a movement-classification signal indicating handheld movement when a threshold number of filtered signals satisfies corresponding signal thresholds. Moreover, in certain instances, the movement detection system 106 generates the movement-classification signal to indicate movement when a single filtered signal satisfies a corresponding signal threshold.

In some instances, in reference to FIG. 5, to convert the filtered signals 510 into the movement-classification signal 514, the movement detection system 106 can generate refined movement-classification signals for one or more time periods. For example, the movement detection system 106 can generate initial movement-classification signals (as binary signals) by applying signal thresholds to filtered signals. Subsequently, the movement detection system 106 applies a moving-average filter to the initial movement-classification signals to generate (non-binary) moving-average signals from the initial movement-classification signals. In certain embodiments, the movement detection system 106 further utilizes a median filter on the moving-average signals to generate modified moving-average signals. To generate the refined movement-classification signals (as binary signals), the movement detection system 106 can apply hysteretic thresholds to the modified moving-average signals.

To illustrate, the movement detection system 106 applies a moving-average filter on initial movement-classification signals to generate moving-average signals (e.g., non-binary signals that indicate movement over a time period). For example, a moving-average filter can smooth values over a time period by utilizing an average of the initial movement-classification signals over various segments of the time period. Furthermore, the movement detection system 106 can also apply a median filter to remove any short-duration-spurious signals from the moving-average signals in resulting modified moving-average signals. In certain instances, by utilizing a moving-average filter (and/or a median filter) on the initial movement-classification signals, the movement detection system 106 converts the initial (binary) movement-classification signals into non-binary moving-average signals (or further into modified non-binary moving-average signals) that indicate movement over one or more time periods.

Subsequently, the movement detection system 106 can generate refined movement-classification signals as an example of the movement-classification signals 514 depicted in FIG. 5. In particular, the movement detection system 106 can further analyze the (non-binary) moving-average signals (or modified moving-average signals) using a hysteretic threshold to generate refined movement-classification signals for one or more time periods. Specifically, the movement detection system 106 can apply a hysteretic threshold to convert the moving-average signals into (binary) refined movement-classification signals for a time period. For instance, the movement detection system 106 determines that a moving-average signal satisfies an upper-hysteretic-signal threshold to flag (or set) a movement-classification signal to indicate handheld movement (e.g., set to "true") at a time period until a lower-hysteretic-signal threshold is satisfied by the moving-average signal (e.g., at a later time in the time period). By doing so, the movement detection system 106 generates a refined movement-classification signal that indicates movement (or no movement) across a time period (e.g., from the trigger of an upper-hysteretic-signal threshold to the trigger of a lower-hysteretic-signal threshold).

As an example, the movement detection system 106 determines that a moving-average signal satisfies an upper-hysteretic-signal threshold (e.g., by meeting or exceeding the upper-hysteretic-signal threshold). Upon identifying that the moving-average signal satisfies the upper-hysteretic-signal threshold, the movement detection system 106 converts the moving-average signal at an initial time to a refined movement-classification signal that indicates a handheld movement (e.g., a "true" signal). Then, the movement detection system 106 continues to generate and set a refined movement-classification signal that indicates a handheld movement from the moving-average signals at subsequent times from the initial time until the moving-average signals satisfy a lower-hysteretic-signal threshold.

Indeed, the movement detection system 106 can check whether the moving-average signals satisfy the lower-hysteretic-signal threshold by determining when the moving-average signals reach (or fall below) the lower-hysteretic-signal threshold (e.g., a lower bound). At a time when the moving-average signals satisfy the lower-hysteretic-signal threshold, the movement detection system 106 can generate and set a refined movement-classification signal that indicates no handheld movement (e.g., a "false" signal). By doing so, the movement detection system 106 can generate a refined movement-classification signal that indicates a handheld movement over a period of time (e.g., to identify continuous or sustained handheld movement of a computing device). In addition, the movement detection system 106 can utilize the upper-hysteretic-signal threshold and lower-hysteretic-signal threshold to generate the refined movement-classification signals over various periods of time to identify time periods of handheld movement even when the computing device is not in continuous motion via handheld movement (and to also fill gaps that may be caused by the initial movement-classification signals determined from filtered signals and signal thresholds).

In some embodiments, the movement detection system 106 expands a refined movement-classification signal that indicates handheld movement in both directions of time until a lower-hysteretic-signal threshold indicates that a handheld movement may not exist in each of the time directions. For instance, upon identifying that the moving-average signal satisfies the upper-hysteretic-signal threshold at the initial time, the movement detection system 106 generates and flags the refined movement-classification signals to indicate handheld movement over a period of time that covers both subsequent and previous times from the initial time. Indeed, the movement detection system 106 can continue to flag the refined movement-classification signals to indicate handheld movement in both the subsequent and previous times from the initial time until the moving-average signals satisfy a lower-hysteretic-signal threshold.

In particular, the movement detection system 106 can generate and flag a refined movement-classification signal to indicate a handheld movement from moving-average signals in both directions of a time region. Indeed, the movement detection system 106 can continuously flag the refined movement-classification signal to indicate a handheld movement for previous times from the initial time until a moving-average signal in the previous time direction reaches the lower-hysteretic-signal threshold. Likewise, the movement detection system 106 can continuously flag the refined movement-classification signal to indicate a handheld movement for subsequent times from the initial time until a moving-average signal in the subsequent time direction reaches the lower-hysteretic-signal threshold. Such refined movement-classification signals are examples of the movement-classification signals 514 depicted in FIG. 5.

In one or more additional embodiments, the movement detection system 106 can utilize hysteretic variance thresholds as the hysteretic signal thresholds. In particular, the movement detection system 106 can identify hysteretic variance thresholds from a handheld-movement-detection model (e.g., adjusted hysteretic variance thresholds in accordance with one or more embodiments) when the initial movement-classification signals are based on a comparison between filtered variance signals and variance signal thresholds.

In some embodiments, by utilizing hysteretic thresholds as described above, the movement detection system 106 can introduce bias by overshooting transition times between non-handheld movements and handheld movements (and vice versa) indicated by movement-classification signals over a range of time. To correct for signals that misrepresent such movement transitions, in some embodiments, the movement detection system 106 can apply a signal bias correction to the movement-classification signal. For instance, the movement detection system 106 can reduce a time period of a movement-classification signal that indicates a handheld movement (e.g., is within a "true" state) by shortening (or trimming) such time periods. In some embodiments, the movement detection system 106 utilizes a threshold-erosion value (e.g., that is configured by a user) to reduce the time period of a movement-classification signal that indicates handheld movement. Because such time periods may be displaced by the threshold-erosion value (e.g., a percentage value) or a similar value, the movement detection system 106 can correct for the displacement by reducing the time period for a movement-classification signal indicating handheld movement by the threshold-erosion value. Indeed, the movement detection system 106 can reduce the time period of a movement-classification signal on both sides of a time range in which the movement-classification signal indicates handheld movement.

As further shown in FIG. 5, the movement detection system 106 can utilize movement-classification signals 514 in the detection of handheld movement 516. In particular, the movement detection system 106 can detect handheld movement of a computing device during a time period based on a movement-classification signal corresponding to that time period. For instance, utilizing the one or more approaches described above, the movement detection system 106 generates movement-classification signals across one or more time periods that indicate handheld movement or no handheld movement (e.g., via binary signals). The movement detection system 106 can utilize the movement-classification signals that are flagged to indicate handheld movement (e.g., a "true" signal) to identify and tag handheld movements for a computing device across the one or more time periods. By doing so, the movement detection system 106 is able identify periods of times in which a handheld movement is detected for a computing device while the computing device is in a moving or otherwise operational vehicle.

Figure 6:
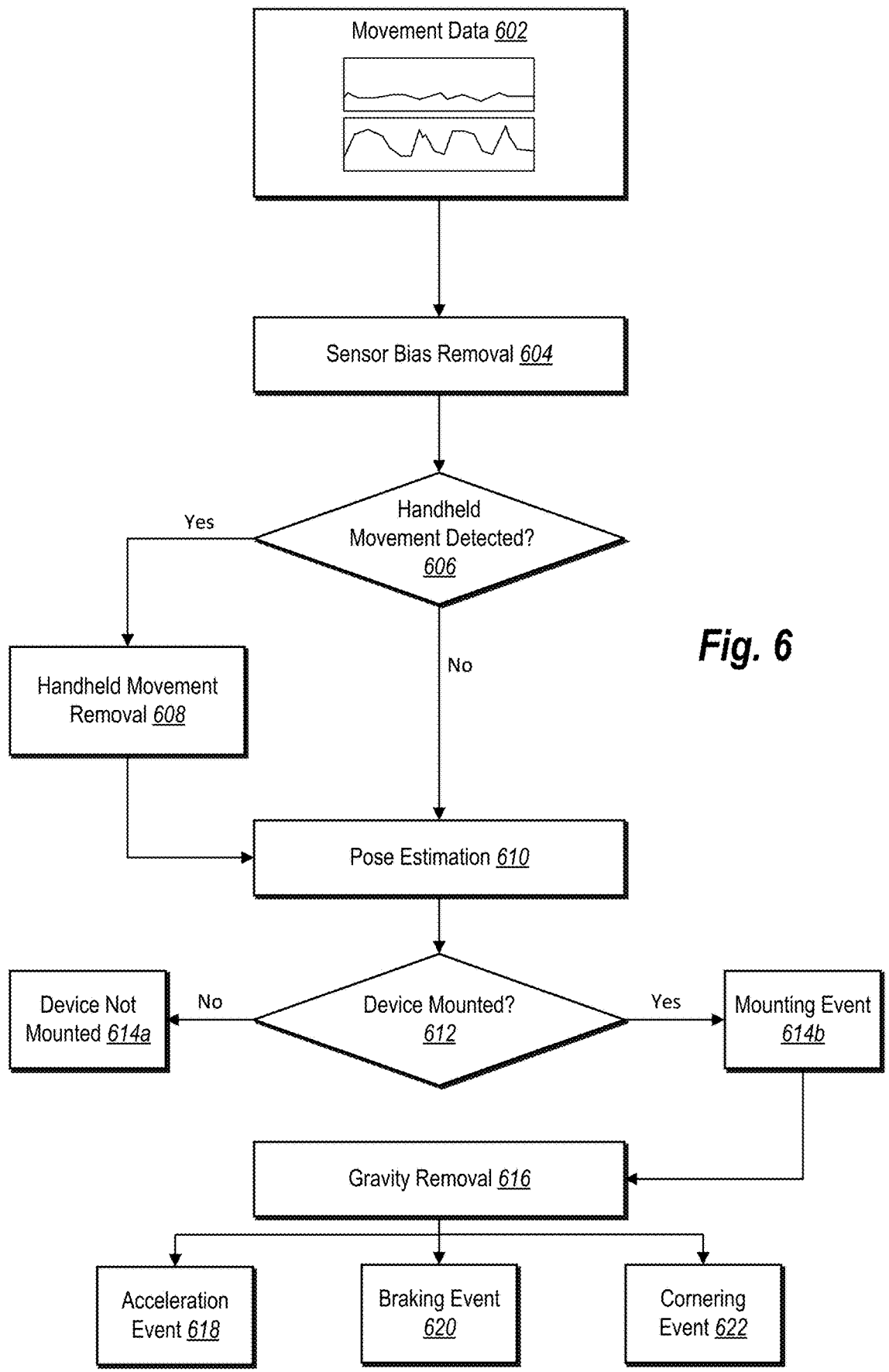
FIG. 6 illustrates an overview diagram of a movement detection system detecting handheld movements of a computing device, whether the computing device is mounted or otherwise secured, or vehicle movements in accordance with one or more embodiments.

As mentioned above, the movement detection system 106 can also utilize movement data from a computing device to determine an orientation of the computing device in relation to a vehicle and/or detect vehicle movements. In accordance with one or more embodiments, FIG. 6 illustrates the movement detection system 106 detecting (or determining) an orientation of the computing device or various types of vehicle movements using movement data from a computing device. In particular, FIG. 6 illustrates the movement detection system 106 detecting (or determining) the orientation of the computing device and/or various types of vehicle movements using varying approaches depending on the detection of handheld movement from the computing device.

For example, as shown in an act 606 of FIG. 6, the movement detection system 106 detects whether a handheld movement occurs based on movement data 602. Moreover, as shown in FIG. 6, if the movement detection system 106 detects handheld movement from the movement data 602, the movement detection system 106 removes (or isolates) the movement data corresponding to the handheld movement (in an act 608) prior to performing pose estimation. Otherwise, as illustrated in FIG. 6, if the movement detection system 106 does not detect handheld movement from the movement data 602, the movement detection system 106 does not perform handheld movement removal prior to utilizing the movement data 602 for pose estimation.

As further shown in FIG. 6, in both cases, the movement detection system 106 utilizes the resulting movement data to determine (in an act 612) if the computing device is mounted or otherwise secured to a vehicle via a pose estimation of the movement data 602 (from an act 610). Additionally, as illustrated in FIG. 6, the movement detection system 106 also detects various vehicle movements using the movement data 602. For instance, as shown in FIG. 6, if the computing device is determined to be mounted (e.g., a mounting event 614*b*) from the movement data 602, the movement detection system 106 utilizes the movement data 602 to detect various vehicle movements such as an acceleration event 618, a braking event 620, or a cornering event 622.

As also shown in FIG. 6, the movement detection system 106 can also perform sensor bias removal in an act 604 on the movement data 602. The movement detection system 106 can perform sensor bias removal as described above (e.g., in relation to FIG. 5). For example, the movement detection system 106 can utilize computing device characteristics and/or hardware characteristics corresponding to the computing device associated with the movement data 602 to remove portions of (or adjust) the movement data 602 (i) millimeters, centimeters, or meters per second squared for acceleration, (ii) degrees or a small portion of degrees for a gyroscope rotation, or (iii) coordinates in a particular direction or with reference to a particular axis for GPS data.

As just mentioned and as illustrated in FIG. 6, upon determining that a handheld movement is not detected in the act 606, the movement detection system 106 can utilize the movement data 602 for a pose estimation in the act 610. The movement detection system 106 can estimate an orientation or pose of the computing device as described by Alya Abbott et al., Aligning Provider-Device Axes with Transportation-Vehicle Axes to Generate Driving-Event Scores, application Ser. No. 16/820,528 (filed Mar. 16, 2020) (hereinafter "Abbott"), the contents of which are hereby incorporated by reference in their entirety. In some embodiments, the movement detection system 106 utilizes the entirety of the movement data 602 for pose estimation when a handheld movement is not detected within the movement data 602. Indeed, in some instances, the movement detection system 106 can utilize the movement data 602 for pose estimation more accurately when no handheld movement is detected and that the computing device is secured to the vehicle or positioned such that it is not being moved by human influence.

As also shown in FIG. 6, when a handheld movement is detected in the act 606, the movement detection system 106 removes (or isolates) the movement data corresponding to the handheld movement by performing handheld movement removal in the act 608. For example, the movement detection system 106 can remove movement data from the movement data 602 that corresponds to time periods where handheld movement is detected (e.g., based on movement-classification signals). Indeed, the movement detection system 106 can remove (or isolate) portions of movement data corresponding to time periods where handheld movement is detected and utilize the remaining movement data for pose estimation in the act 610.

For instance, the movement detection system 106 can determine a pose estimation (in the act 610) for movement data 602 of a computing device. In one or more embodiments, the pose estimation can indicate an orientation (or pose) of a computing device with respect to the vehicle in which the computing device is situated or with respect to axes for the vehicle. For instance, the movement detection system 106 can determine a pose estimation as described below (e.g., in relation to FIG. 7). As also shown in FIG. 6, upon determining the pose estimation (in the act 610), the movement detection system 106 can determine whether the device is mounted in accordance with one or more embodiments (e.g., in relation to FIG. 7). In some embodiments, the movement detection system 106 determines whether the computing device is mounted or otherwise secured to the vehicle as described by Abbott.

In some instances, as shown in FIG. 6, the movement detection system 106 determines that the computing device is not mounted 614a. As also shown in FIG. 6, in some instances, the movement detection system 106 determines the mounting event 614b (e.g., the computing device is mounted within the vehicle). In such embodiments, as shown in FIG. 6, the movement detection system 106 proceeds to detect vehicle movements.

For example, as shown in FIG. 6, upon identifying the mounting event 614b, the movement detection system 106 proceeds to detect vehicle movement. Because the computing device is determined to be secured, the movement detection system 106 can recognize the movement data 602 (of the computing device) as attributable to vehicle motion. In addition, as shown in FIG. 6, the movement detection system 106 removes gravity-based characteristics from the movement data 602 by performing gravity removal in an act 616. The movement detection system 106 can remove gravity by factoring out gravitational acceleration as a vertical-target acceleration, as described by Abbott.

As further shown in FIG. 6, the movement detection system 106 utilizes movement data 602 of the computing device to detect the acceleration event 618, the braking event 620, or the cornering event 622 for a vehicle in which the computing device is placed. As an example, the movement detection system 106 can detect the acceleration event 618 or the braking event 620 by removing gravitational motion data from the movement data 602 followed by using determined GPS bearing changes, gyroscope rotations, and lateral accelerations from the movement data 602. Furthermore, the movement detection system 106 can detect the cornering event 622 by removing gravitational motion data from the movement data 602 and by using the movement data 602 to additionally detecting candidate corners, estimating acceleration at the candidate corners, and filtering the candidate corners using various measurements from the movement data 602. This disclosure describes detecting such acceleration, braking, or cornering events in greater detail below in relation to FIG. 8.

Figure 7:
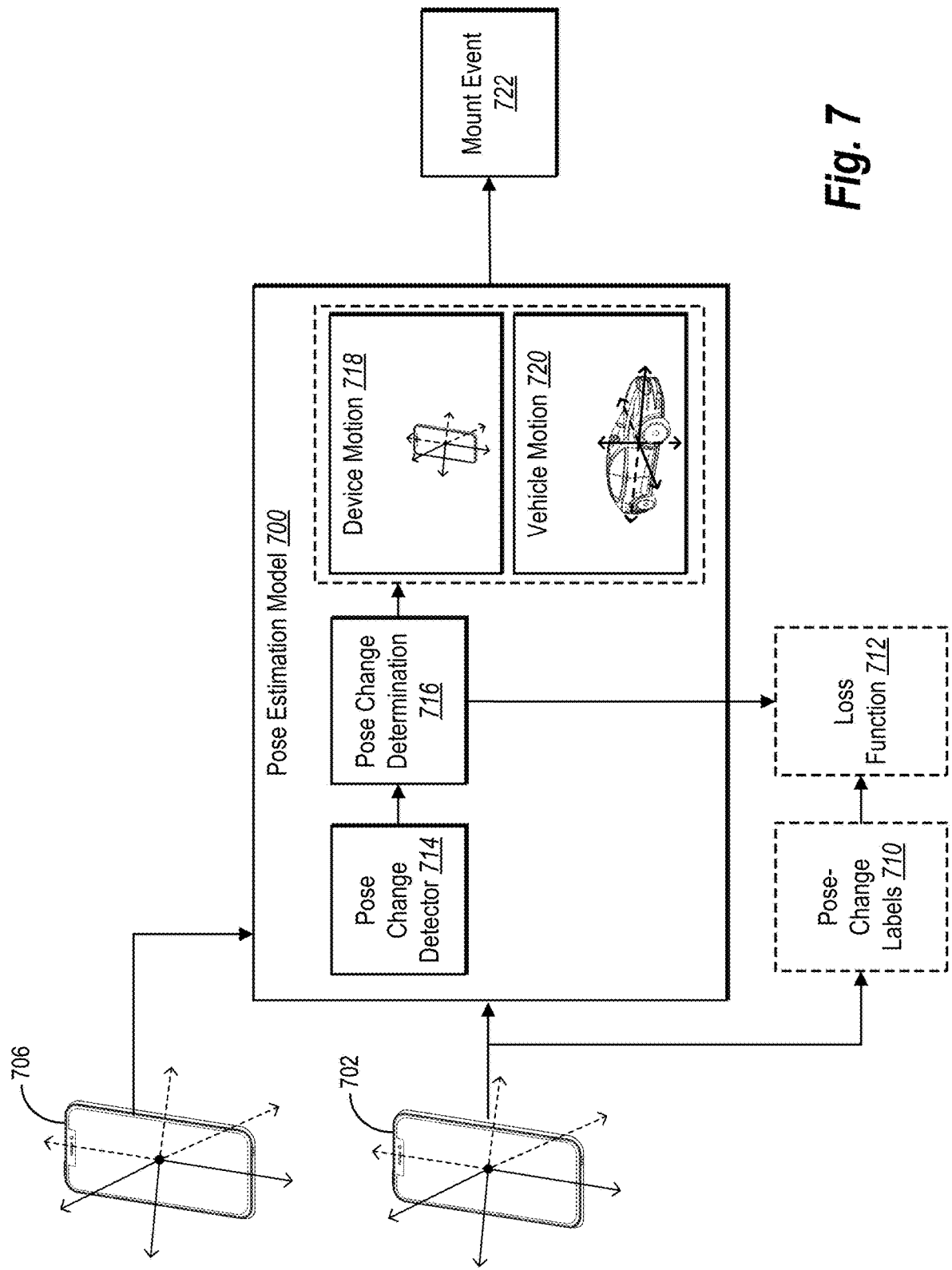
FIG. 7 illustrates a diagram of a movement detection system utilizing movement data of a computing device to train a pose estimation model to detect whether a computing device is mounted within a vehicle and whether the computing device is adjusted while mounted in accordance with one or more embodiments.

As mentioned above, the movement detection system 106 can utilize movement data from a computing device to determine device orientation and to detect mounting events of the computing device. In accordance with one or more embodiments, FIG. 7 illustrates the movement detection system 106 training a pose estimation model using movement data deviations to determine a mounting event for a computing device. In particular, the movement detection system 106 can identify pose-change labels for movement data from a moveable computing device by using movement data deviations between a secured computing device and a moveable computing device. Then, the movement detection system 106 can train the pose estimation model to accurately identify pose changes to utilize in pose estimation (for the detection of a mounting event).

As shown in FIG. 7, the movement detection system 106 receives movement data from a mounted computing device 702. The movement detection system 106 can utilize movement data deviations between (i) movement data from the mounted computing device 702 and (ii) movement data from a secured computing device 706 to identify signal thresholds for determining whether the mounted computing device 702 has been adjusted (e.g., in a mount on the vehicle). As further shown in FIG. 7, the movement detection system 106 can utilize the pose change detector 714 with the movement data of the mounted computing device 702 to determine the pose change determination 716. In some embodiments, as shown in FIG. 7, the movement detection system 106 compares pose-change labels 710 (corresponding to movement data from the mounted computing device 702) with the pose change determination 716 using a loss function 712. Indeed, as illustrated in FIG. 7, the movement detection system 106 can determine a loss metric from the loss function 712 to train (or configure) the pose change detector 714 of the pose estimation model 700.

As shown in FIG. 7, the movement detection system 106 utilizes the movement data from the mounted computing device 702 with the pose estimation model 700 to detect a mount event 722. In particular, as illustrated in FIG. 7, the pose estimation model 700 utilizes the pose change detector 714 to determine a pose change determination 716 from the movement data of the mounted computing device 702. Furthermore, as shown in FIG. 7, the pose estimation model 700 also determines movement data that is attributable to device motion 718 and determines movement data that is attributable to vehicle motion 720 from the movement data of the mounted computing device 702. The movement detection system 106 utilizes the device motion 718 and the vehicle motion 720 to determine the mount event 722. In particular, the movement detection system 106 can determine that the mounted computing device 702 is mounted or not mounted based on a pose estimation (e.g., the orientation) of the mounted computing device 702, as described above.

In some instances, movements (e.g., via vehicle motion or loose mounting) and/or adjustments (e.g., via human influence) of a computing device may affect alignment of the computing device with the vehicle. In particular, in some embodiments, adjustments and/or movements of the computing device may not be detected by the movement detection system 106 and, thus, the correct orientation of the device may not be known or determined (e.g., mis-aligned pose estimations and/or vehicle motion estimations). To resolve the above-mentioned problem, the movement detection system 106 can configure or train a pose estimation model that detects adjustments to the computing device and an accurate pose estimation thereafter by utilizing movement data deviations between a secured device and a moveable device.

For example, to train a pose estimation model to estimate pose information for a computing device, the movement detection system 106 can utilize movement data from a secured device (e.g., an in-vehicle-display device) and a mounted device and further label movement data from the mounted device with pose-change labels (as ground truth labels). In particular, the movement detection system 106 can identify instances from movement data deviations between movement datasets from the mounted computing device 702 and the secured computing device 706 as pose changes. More specifically, the movement data deviations can indicate instances in which movements (e.g., via vehicle motion or loose mounting) and/or adjustments (e.g., via human influence) of a computing device may affect alignment of the mounted computing device 702.

As noted above, in one or more embodiments, the movement detection system 106 receives labels for portions of movement data from the mounted computing device 702 that correspond to the identified pose changes as pose-change labels (e.g., ground truth labels or training signals). In some embodiments, the movement detection system 106 receives such labels through user interactions in a visual representation of the movement data from the mounted computing device 702. More specifically, the above-mentioned pose-change labels can include user-defined labels for portions of movement data of the mounted computing device 702 that indicate movement of the mounted computing device 702.

In some embodiments, the movement detection system can utilize a pose-change threshold that indicates an amount of movement data deviation—between movement data from the mounted computing device 702 and the secured computing device 706—that represents the presence of a pose change. As an example, the movement detection system 106 can compare the movement data deviations to a pose-change threshold to determine whether a pose change occurred on the mounted computing device 702. To illustrate, the movement detection system 106 can determine the occurrence of a pose change on the mounted computing device 702 based on the pose-change threshold and compare the pose change determination to the pose-change label.

Indeed, as mentioned above, the movement detection system 106 can train the pose estimation model to accurately identify pose changes of a computing device and pose estimations due to the pose changes (e.g., an orientation of the computing device in relation to a vehicle). Specifically, the movement detection system 106 can train a pose estimation model that utilizes movement data from a single computing device (e.g., a provider device that is moveable from a vehicle) to predict pose changes of the single computing device.

For example, the movement detection system 106 trains the pose estimation model by providing movement data from the mounted computing device 702 (exclusively) to the pose estimation model and, in turn, receives predictions of a pose change of the mounted computing device 702. Then, the movement detection system 106 compares the predicted pose change to the pose-change labels associated with the movement data of the mounted computing device 702 (as described above) to determine an accuracy of the pose estimation model (e.g., in terms of loss). Indeed, the movement detection system 106 can utilize the determined loss to train the pose estimation model (e.g., via backpropagation). The movement detection system 106 can utilize a pose estimation model that is based on a variety of machine learning approaches including, but not limited to, logistic regression models, neural networks, and/or a gradient boosting decision tree model.

In one or more embodiments, to train the pose estimation model, the movement detection system 106 utilizes gyroscope data readings as the movement data. Furthermore, as described in FIG. 5, the movement detection system 106 can perform sensor bias removal prior to determining a pose change for a computing device from a pose estimation model. In one or more additional embodiments, the movement detection system 106 can utilize a variety of data readings from the movement data of a computing device for training and utilizing a pose estimation model. For example, the movement detection system 106 can utilize various combinations of accelerometer data readings, gyroscope data readings, and GPS data for utilizing and training a pose estimation model. Moreover, the movement detection system 106 can perform gravity removal prior to training a pose estimation model and/or utilizing a pose estimation model to predict pose changes of a computing device.

As previously mentioned and in relation to FIG. 7, the movement detection system 106 can utilize a pose estimation model (that is trained using pose-change labels to determine pose changes) to determine pose estimations from movement data of a computing device. In one or more embodiments, the movement detection system 106 determines a pose of a computing device by utilizing device motion in relation to vehicle motion with a pose change determination. For example, the movement detection system 106 can identify a pose of the computing device that matches the computing device motion with the vehicle motion (e.g., using a pose change determination 716, device motion 718, and vehicle motion 720). As noted above, Abbott further describes determining pose estimations by utilizing device motion in relation to vehicle motion. By utilizing pose change predictions within the pose estimation model, the movement detection system 106 can account for adjustments and/or movements of the computing device that may not be detected to further determine the correct orientation of the device.

In some embodiments, the movement detection system 106 utilizes outputs from the pose estimation model to estimate a pose of a computing device. For example, the movement detection system 106 can utilize the pose estimation model to identify adjacent regions (from time periods) in which an estimated pose is similar to combine the adjacent regions for a more accurate estimation of the pose of the computing device. In addition, when a pose change is predicted at a time period within a region of time, the movement detection system 106 can split the region such that it includes two separate pose estimations. By splitting and merging regions associated with a time period utilizing the pose estimation model, the regions of time include more accurate estimations of pose change and pose estimations.

Although not shown in FIG. 7, in some embodiments, the movement detection system 106 performs handheld movement removal from the movement data of the mounted computing device 702 (as described in FIG. 6) prior to utilizing the pose estimation model 700 to determine a pose estimation from the movement data of the mounted computing device 702. In addition, although FIG. 7 illustrates the movement detection system 106 utilizing the mounted computing device 702 with the secured computing device 706 to train the pose estimation model 700 prior to detection of a mount event 722, the movement detection system 106 can utilize the pose estimation model 700 with movement data from a single computing device. In particular, the movement detection system 106 can receive movement data from a single computing device (e.g., a provider device) and utilize the pose estimation model to determine a pose change determination and utilize the pose change determination with determined device motion and vehicle motion to identify a pose estimation for the computing device in accordance with one or more embodiments. Furthermore, the movement detection system 106 can utilize the identified pose estimation of the computing device to determine whether the computing device is mounted within the associated vehicle.

Indeed, in one or more embodiments, the movement detection system 106 can utilize an estimated pose of a computing device to determine whether the computing device is mounted within a vehicle. For instance, the movement detection system 106 can utilize the pose estimation to determine an orientation or positioning of the display screen of the computing device. Moreover, the movement detection system 106 can utilize the positioning to determine whether the computing device is mounted.

In some instances, the movement detection system 106 utilizes a statistical model that maps computing device orientations and a likelihood of the computing device being mounted when in the particular orientation to determine whether the computing device is mounted. For example, the movement detection system 106 can reference the mapping to determine the likelihood (e.g., in terms of a probability) that a computing device is mounted when the computing device is in a particular orientation. Indeed, utilizing the likelihood, the movement detection system 106 can classify the computing device (in its estimated orientation) as mounted (or not mounted). For instance, the movement detection system 106 can assign a higher likelihood (for a mounted event) for an orientation in which the display screen of a computing device is facing a driver seat compared to an orientation in which the display screen of a computing device is facing the floor (or ceiling) of a vehicle.

In some embodiments, the movement detection system 106 can also utilize a variety of other approaches to determine that the provider device is mounted including but not limited to, utilizing the pose estimation information with a machine learning model to predict whether the computing device is mounted or utilizing a mapping that indicates computing device position ranges (e.g., in terms of axes and/or orientation ranges) to identify the computing device as mounted or not mounted.

Figure 8:
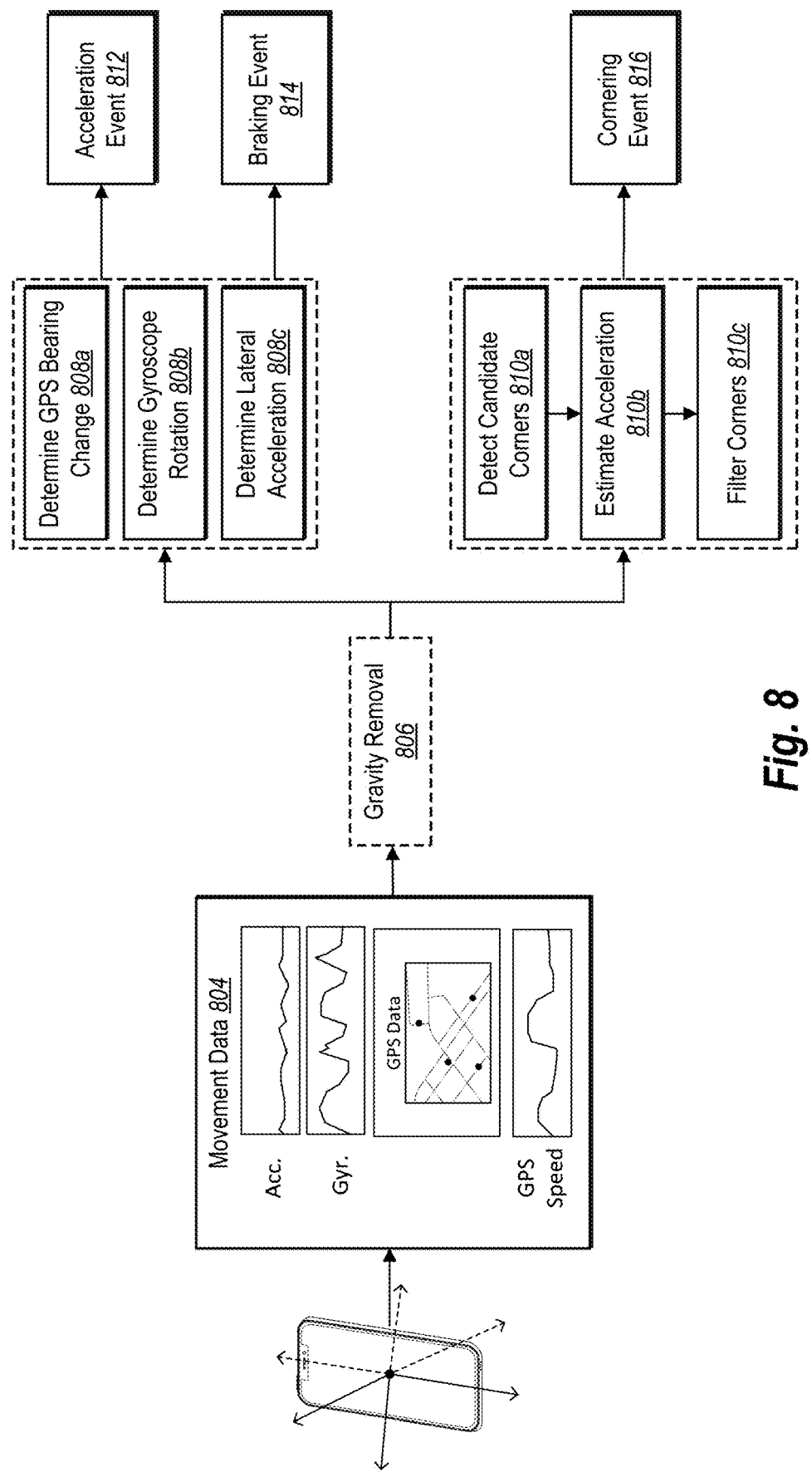
FIG. 8 illustrates a diagram of a movement detection system utilizing movement data of a computing device to detect vehicle movements in accordance with one or more embodiments.

As mentioned above, the movement detection system 106 can utilize movement data of a computing device to detect various vehicle movements. In accordance with one or more embodiments, FIG. 8 illustrates the movement detection system 106 detecting various vehicle movements by utilizing movement data of a computing device (e.g., a mobile device) that is (travelling) within a vehicle. In particular, the movement detection system 106 can detect acceleration events, braking events, and cornering events from movement data of a computing device that is within a vehicle.

As shown in FIG. 8, the movement detection system 106 receives movement data 804 from a computing device. The movement data 804 includes accelerometer data, gyroscope data, GPS data, and speed data. The movement detection system 106 can receive movement data as described above. Furthermore, the movement data 804 can be from a computing device that is within a vehicle (and which experiences movements of the vehicle).

As further shown in FIG. 8, the movement detection system 106 can perform gravity removal in an act 806 on the movement data 804. In particular, the movement detection system 106 can estimate gravity (e.g., a gravitational force, gravitational direction) from the movement data of a computing device. For example, the movement detection system 106 can estimate gravity (or gravitational motion) from movement data of a computing device using a variety of (or various combinations of) approaches, such as, but not limited to, low-pass filtering, var-weighted filtering, and/or an aligned estimation based on computing device pose estimations.

In some embodiments, the movement detection system 106 estimates gravitational motion from movement data of a computing device as described by Abbott. In particular, as described by Abbot, the movement detection system 106 can identify gravitational acceleration as a vertical-target acceleration. Furthermore, in one or more embodiments, the movement detection system 106 removes the estimated gravity from the movement data. Indeed, can identify the movement data associated with gravitational motion (e.g., the gravitational acceleration) and remove the movement data corresponding to the gravitational motion. By doing so, in some embodiments, the movement detection system 106 determines acceleration and/or rotational movements of a computing device independent of gravity.

As further shown in FIG. 8, the movement detection system 106 can utilize the movement data 804 from the computing device to detect an acceleration event 812. In particular, as illustrated in FIG. 8, the movement detection system 106 can determine GPS bearing changes in an act 808a, determine gyroscope rotation in an act 808b, and determine lateral acceleration in an act 808c from the movement data 804. Furthermore, the movement detection system 106 can utilize the determined GPS bearing change, the gyroscope rotation, and the lateral acceleration to detect an acceleration event 812 and/or a braking event 814.

For instance, the movement detection system 106 can determine GPS bearing changes in the act 808a for the computing device. In some embodiments, the movement detection system 106 utilizes a difference of GPS bearing between two instances of time and a speed (e.g., a directional velocity) to determine a GPS bearing change via movement data of a computing device (for a vehicle). Accordingly, the movement detection system 106 can determine a GPS bearing change (e.g., in terms of radians) for a computing device within a vehicle independent of a pose of the computing device and estimated gravitational motion on the computing device.

Furthermore, the movement detection system 106 can determine gyroscope rotation in the act 808*b* for the computing device. For example, the movement detection system 106 can determine a gyroscope rotation of a vehicle from movement data of a computing device. In some cases, the relevant movement is independent of pose information of the computing device. For instance, in some embodiments, the movement detection system 106 determines a dot product of vectors representing gravity and rotation to calculate gyroscope rotation. In particular, the movement detection system 106 determines a dot product between gravitational motions (e.g., in the x-axis, y-axis, and z-axis) and rotation movement data from the movement data of the computing device. Then, in some embodiments, the movement detection system 106 multiplies the dot product by speed data (e.g., a velocity measurement) from the movement data of the computing device to determine gyroscope rotation movement data (for the vehicle) around gravitational motion data of a computing device.

In addition, as shown in FIG. 8, the movement detection system 106 can determine lateral acceleration of the vehicle from movement data 804 in the act 808*c*. In particular, the movement detection system 106 can utilize estimated pose information from the movement data 804 (e.g., the estimated pose information of a computing device in x-axis, y-axis, and z-axis directions using a pose estimation matrix) with accelerometer data to determine a lateral acceleration of a vehicle. Indeed, the movement detection system 106 can utilize the gyroscope rotation movement data (for the vehicle) as a turn rate and the GPS bearing change information to determine a lateral acceleration for the vehicle. As suggested above, the movement detection system 106 can determine GPS bearing changes, gyroscope rotation, and lateral acceleration in the acts 808*a*, 808*b*, and 808*c*, respectively, as further described by Abbott.

Based on the above measurements (e.g., the GPS bearing change, the gyroscope rotation movement data, the lateral acceleration of a vehicle), the movement detection system 106 can determine the acceleration event 812. For example, the movement detection system 106 can determine the lateral acceleration of a vehicle (e.g., meters per second squared) at a given time. In some instances, the movement detection system 106 can utilize the lateral acceleration of the vehicle to determine a harsh acceleration. For instance, the movement detection system 106 can compare an estimate lateral acceleration to a threshold acceleration to determine if the vehicle is accelerating harshly (e.g., accelerating beyond an acceleration that is determined to indicate safe driving behavior).

Furthermore, the movement detection system 106 can also determine the braking event 814 based on the above measurements (e.g., the GPS bearing change, the gyroscope rotation movement data, the lateral acceleration of a vehicle). For instance, in one or more embodiments, the movement detection system 106 can determine a negative lateral acceleration as a braking event. Moreover, the movement detection system 106 can determine a harsh braking behavior of a vehicle from the movement data of the computing device. In particular, the movement detection system 106 can compare an estimated (negative) lateral acceleration to a threshold acceleration (e.g., an acceleration that indicates harsh braking) to determine if the vehicle is braking harshly (e.g., negatively accelerating beyond an acceleration that is determined to indicate safe driving behavior).

As further shown in FIG. 8, the movement detection system 106 can detect the cornering event 816. Indeed, the movement detection system 106 can utilize the movement data 804 to detect candidate corners in an act 810*a*, estimate acceleration in an act 810*b*, and filter corners in an act 810*c*. Then, the movement detection system 106 can detect the cornering event 816 using the detected candidate corners, estimated acceleration, and corner filtering.

As just noted, the movement detection system 106 can detect candidate corners in the act 810*a*. In particular, the movement detection system 106 can determine a GPS bearing change and gyroscope rotation movement data corresponding to a vehicle (from the movement data of a computing device) in accordance with one or more embodiments. Then, the movement detection system 106 can utilize the GPS bearing change and gyroscope rotation movement data to detect a candidate turn movement (e.g., corner event) for the vehicle. In some instances, the movement detection system 106 indicates a threshold amount of time around a detected candidate corner event as part of the candidate turn movement (e.g., padding a detected candidate turn by a threshold time). Indeed, the movement detection system 106 can identify a location and a time associated with the detected candidate turn movement.

Furthermore, as shown in FIG. 8, the movement detection system 106 can estimate an acceleration (e.g., a lateral acceleration) for the vehicle in the act 810*b*. In particular, the movement detection system 106 can determine (or measure) a lateral acceleration in accordance with one or more embodiments for one or more detected candidate corners (e.g., detected candidate turn movements from the act 810*a*). In some instances, the movement detection system 106 identifies candidate corners in which the determined lateral acceleration exceeds a threshold acceleration (e.g., accelerating beyond an acceleration that is determined to indicate safe driving behavior).

As further shown in FIG. 8, in some embodiments, the movement detection system 106 filters (detected) corners in the act 810*c*. For instance, the movement detection system 106 filters the detected candidate corners utilizing a confidence filtering approach. As an example, in some embodiments, the movement detection system 106 discards (or removes) detected candidate corners based on a fusion (or combination) of measurements from the movement data of the computing device. In particular, the movement detection system 106 can discard or remove a candidate corner from consideration as a cornering event when the candidate corner corresponds to a pose residual that is below a threshold pose residual, a gyroscope rotation activity is below a threshold gyroscope rotation value, and/or a turn rate from the gyroscope data that fails to meet a threshold turn rate (e.g., in radians per second). In one or more embodiments, the movement detection system 106 can determine and utilize (for corner event detection) a peak turn rate (e.g., radians per second for how fast a vehicle turned at the peak of the turn), a mean turn rate (e.g., radians per second for how fast a vehicle turned on average through a corner), and/or a turn bearing change (e.g., radians for how much the vehicle turned at a corner).

Utilizing the above approaches (e.g., candidate corner detection, acceleration estimation, corner filtering), the movement detection system 106 can determine the cornering event 816. For instance, the movement detection system 106 can classify a vehicle movement (determined from movement data of a computing device) as the vehicle turning through a corner. In some embodiments, the movement detection system 106 utilizes the identified cornering event with the acceleration estimation to determine that the cornering event corresponds to a harsh cornering behavior of the vehicle. To do so, in some embodiments, the movement detection system 106 compares the acceleration estimation to a threshold acceleration corresponding to a given corner (e.g., identified via a GPS location) to determine if the vehicle is experiencing a harsh cornering event (e.g., accelerating through a corner at an acceleration that is beyond an acceleration determined to indicate safe driving behavior).

In one or more embodiments, the movement detection system 106 detects cornering events (or other vehicle movements) based on a turn rate of lateral acceleration. For example, the movement detection system 106 can utilize a threshold on a turn rate in a horizontal axis (e.g., change in yaw in radians per second) from one or more of a bearing differential (e.g., a GPS bearing change) and/or a gyroscope turn rate around gravitational motion. Furthermore, the movement detection system 106 can determine a cornering event based on (i) a threshold on a lateral acceleration (in meters per second) from an aligned lateral acceleration (of the accelerometer data), (ii) an aligned gyroscope combined with speed data (e.g., determined from GPS data), (iii) a bearing differential combined with speed data, (iv) a gyroscope turn rate around gravitational motion combined with speed data, and/or (v) both the bearing differential and the gyroscope turn rate combined with speed data (e.g., multiplied by the speed data). Furthermore, the movement detection system 106 can utilize a received minimum rate of rotation (e.g., in radians per second), a minimum bearing change (e.g., in radians), and/or a minimum duration (e.g., in seconds) for the detection of vehicle movements from movement data of a computing device.

In some embodiments, the movement detection system 106 identifies a time and location corresponding to a detected vehicle movement (e.g., an acceleration event, braking event, cornering event). For instance, the movement detection system 106 can utilize the detected vehicle movements with the identified time and location for the vehicle movements to identify unsafe driving behaviors of a vehicle. In some instances, upon identifying a harsh vehicle movement (e.g., a harsh acceleration event, a harsh braking event, a harsh cornering event), the movement detection system 106 can notify the computing device (e.g., provider device) corresponding to the vehicle of the identified harsh vehicle movement, as described and depicted further by Abbott.

In one or more additional embodiments, the movement detection system 106 can detect harsh acceleration, braking, or cornering events on a per location basis. In particular, the movement detection system 106 can set threshold accelerations, threshold pose residuals, threshold gyroscope rotation values, and/or a threshold turn rates (for detection of the various vehicle movement events as described above) based on a location. For instance, in one or more embodiments, the movement detection system 106 determines the location of the computing device utilizing GPS data. Moreover, the movement detection system 106 identifies a driving type associated with the location (e.g., city driving, highway driving, straight routes, routes with multiple curves/corners). Then, the movement detection system 106 utilizes varying thresholds for unsafe driving behavior based on the identified driving type.

Furthermore, in one or more embodiments, the movement detection system 106 can train (or validate) the detection of vehicle movements by utilizing ground-truth-device pose and ground-truth-gravity direction data from a computing device that is secured to a vehicle. For example, the movement detection system 106 can utilize the ground-truth-device pose and ground-truth-gravity direction data from the secured computing device as high-reliability measurements for vehicle movement. The movement detection system 106 can detect vehicle movement events from movement data of a computing device that is moveable from a vehicle (in accordance with one or more embodiments) and compare the detected vehicle movement events to the vehicle movements determined from the ground-truth-device pose and ground-truth-gravity direction data from the secured computing device.

Indeed, the movement detection system 106 can utilize the differences between the vehicle movements detected by the secured computing device and the moveable computing device to adjust thresholds corresponding to the detection of acceleration, braking, and/or cornering events. For instance, in one or more embodiments, the movement detection system 106 identifies a loss metric (e.g., a root mean-squared error in estimating gravity) between the vehicle movements detected by the secured computing device and the moveable computing device. Then, the movement detection system 106 utilizes the loss metric to adjust thresholds (e.g., acceleration thresholds, threshold gyroscope rotation values, threshold pose residual, threshold turn rate). In some embodiments, the movement detection system 106 determines a recall rate or precision for detecting vehicle movements from movement data of a moveable computing device to that of the detected vehicle movements from the secured computing device. Indeed, the movement detection system 106 can utilize the recall or precision rate to determine whether to further adjust thresholds corresponding to the detection of vehicle movement in accordance with one or more embodiments.

As mentioned above, the movement detection system 106 can display movement data of a secured computing device and movement data of a moveable computing device as a comparison tool. For instance, the movement detection system 106 can, provide for display within a graphical user interface, movement data from both the secured computing device and the moveable computing device to compare the two sets of movement data. In particular, the movement detection system 106 can display movement data such as, accelerometer data, gyroscope data, GPS data, and/or speed data.

Figure 9A:
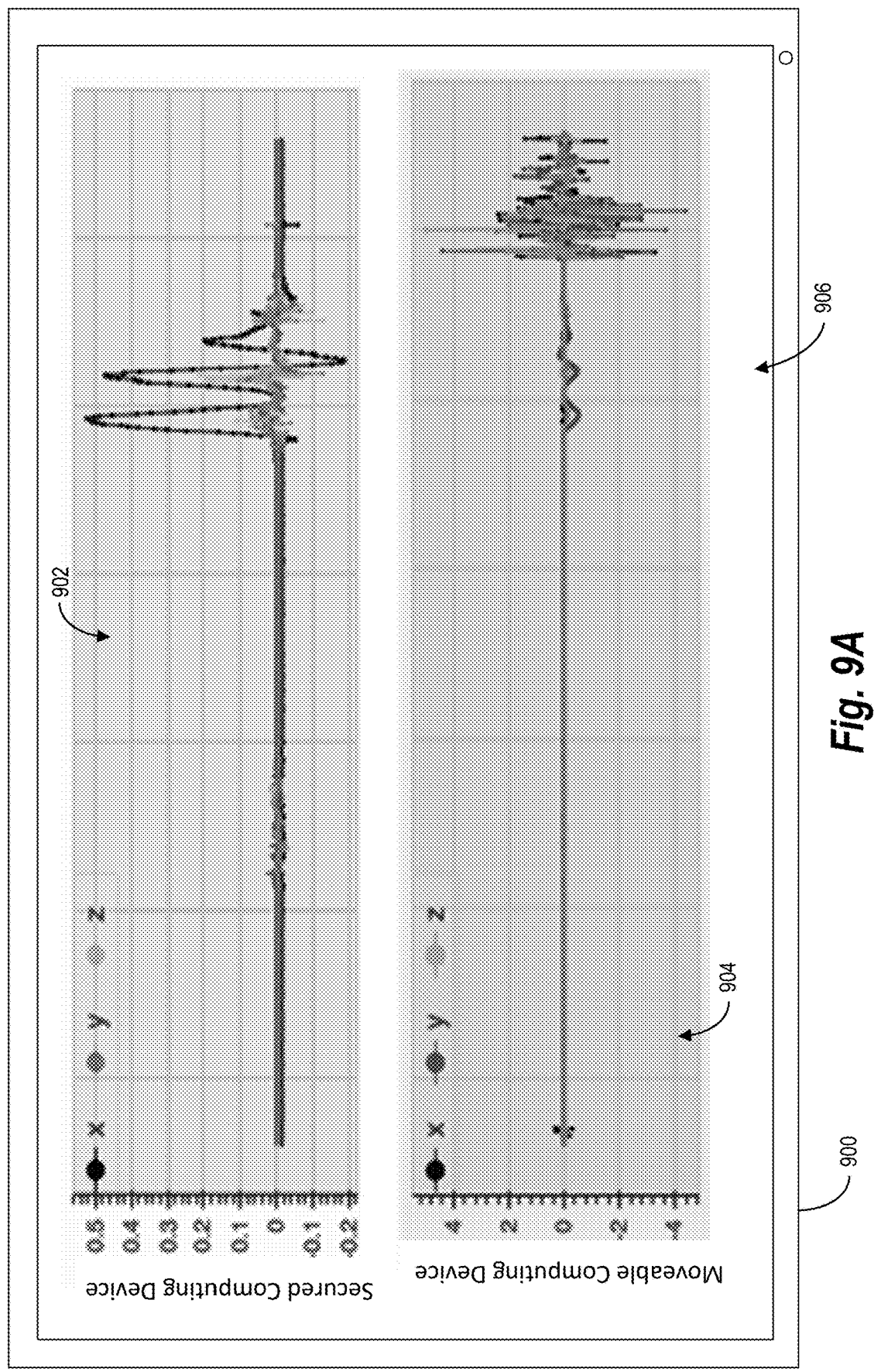
FIGS. 9A and 9B illustrate example graphical user interfaces of a movement detection system displaying movement data in accordance with one or more embodiments.

In accordance with one or more embodiments, FIG. 9A illustrates the movement detection system 106 providing, for display within a graphical user interface 906 of a client device 900, movement data of a secured computing device and movement data of a moveable computing device. As shown in FIG. 9A, the movement detection system 106 displays movement data 902 from a secured computing device and movement data 904 from a moveable computing device. As further shown in FIG. 9A, in some instances, the movement detection system 106 can identify differences between the movement data 902 from the secured computing device and the movement data 904 from the moveable computing device (e.g., the movement data 902 indicates less movement compared to the movement data 904).

Figure 9B:
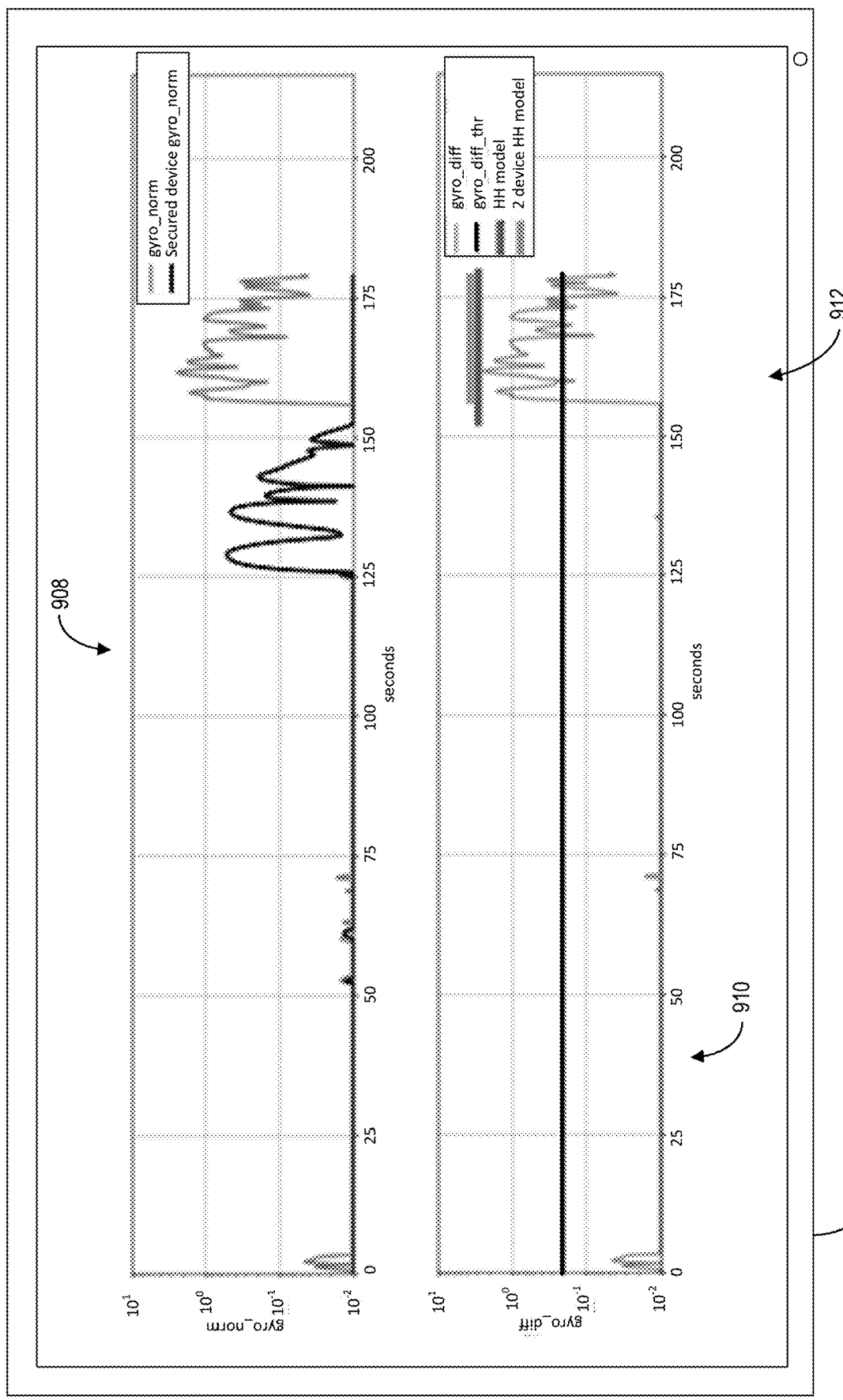

Additionally, FIG. 9B illustrates the movement detection system 106 providing, for display within a graphical user interface 912 of the client device 900, overlaid movement data 908 in which movement data from both a secured computing device (e.g., "secured device gyro_norm") and a moveable computing device (e.g., "gyro_norm") are overlaid. Indeed, the movement detection system 106 can display the overlaid movement data 908 to provide a visual representation of movement data deviations between the secured and moveable computing devices. Moreover, as shown in FIG. 9B, the movement detection system 106 also provides, for display within the graphical user interface 912 of the client device 900, a difference in movement data norms 910 between the secured computing device and the moveable computing device.

In some embodiments, the movement detection system 106 receives adjustments and/or configurations (via input tools) for a handheld-movement-detection model based on the movement data deviations from the graphical user interface 912 in accordance with one or more embodiments. For example, the movement detection system 106 can provide input tools within the graphical user interface 912 to enable the adjustment of the signal threshold (e.g., via a drag tool) displayed within the difference in movement data norms 910. In particular, the movement detection system 106 provides the input tools within the graphical user interface 912 to visually represent a threshold signal in relation to the difference in movement data norms 910 in order to receive user input that adjusts the threshold signal to reflect the difference in movement data norms 910.

As mentioned above, the movement detection system 106 can provide, for display within a graphical user interface, a map-based user interface that displays or utilizes one or more detected vehicle events (as described above). In particular, the movement detection system 106 can provide, for display within a graphical user interface, a map-based user interface that displays vehicle driving behaviors corresponding to one or more computing devices (e.g., provider devices). In accordance with one or more embodiments, FIG. 10 illustrates the movement detection system 106 providing, for display within a graphical user interface, a map-based user interface.

Figure 10:
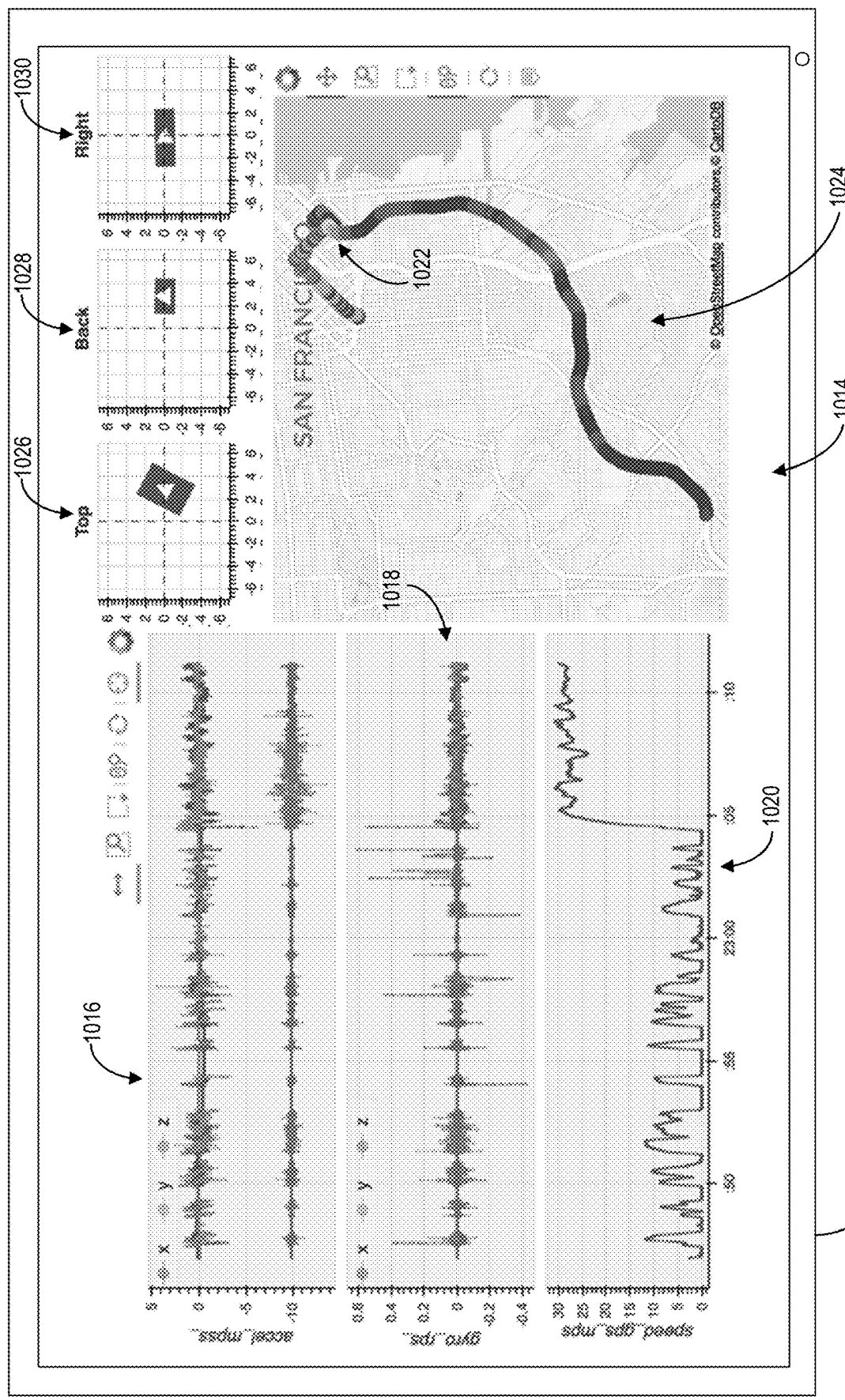
FIG. 10 illustrates an example map-based user interface of a movement detection system for vehicle movements in accordance with one or more embodiments.

As shown in FIG. 10, the movement detection system 106 provides, for display within a graphical user interface 1014 of a client device 1000, a map-based user interface 1024. Indeed, as illustrated in FIG. 10, the movement detection system 106 displays path markers 1022 within the map-based user interface 1024 to indicate vehicle movement. For instance, in one or more embodiments, the movement detection system 106 utilizes color-coded-path markers or patterned-coded-path makers to indicate different vehicle movement patterns (e.g., darker colors for harsh/unsafe vehicle movements and lighter colors for safe vehicle movements) from vehicle movements detected in accordance with one or more embodiments.

As further shown in FIG. 10, the movement detection system 106 displays vehicle movement measurements for time periods within the graphical user interface 1014. Indeed, the movement detection system 106 displays vehicle movement measurements, such as acceleration readings 1016, gyroscope readings 1018, and speed data readings 1020. The movement detection system 106 can display vehicle movement measurements (determined in accordance with one or more embodiments) at a time of their occurrence.

In addition, as shown in FIG. 10, the movement detection system 106 also displays acceleration and rotation data of a vehicle from one or more perspectives (e.g., a top perspective 1026, a back perspective 1028, and a right perspective 1030 in which a vehicle is viewed from its right side). For instance, in reference to FIG. 10, the top perspective 1026, the back perspective 1028, and the right perspective 1030 display acceleration and rotation (e.g., the acceleration and rotation rate) of a vehicle at a given time period. Indeed, the movement detection system 106 can display the top perspective 1026, the back perspective 1028, and the right perspective 1030 of acceleration and rotation data to visually represent a vehicle's movement through different axes.

As suggested above, in one or more embodiments, the movement detection system 106 can receive user inputs within the graphical user interface 1014. For instance, in some embodiments, the movement detection system 106 receives a user input to select a time (e.g., by dragging a vehicle icon within the map-based interface, selecting/inputting a specific time, scrolling). Upon receiving a user input to select a time, the movement detection system 106 can display, within the graphical user interface 1014, vehicle movement information for the selected time. Furthermore, in some embodiments, the movement detection system 106 receives a user input to zoom in and/or zoom out of the map-based user interface 1024. Indeed, upon receiving a user input to zoom in and/or zoom out, the movement detection system 106 can change the zoom (or size) of the map-based user interface. For example, by zooming in, the movement detection system 106 can display detail for vehicle movements in a specific location within the map-based user interface 1024.

In addition, in one or more embodiments, the movement detection system 106 can receive user input to annotate the map-based user interface 1024. For example, the movement detection system 106 can receive a user input that indicates an annotation within the map-based user interface 1024 for a potential corner or turn, potential braking event, and/or potential acceleration. Indeed, the movement detection system 106 can utilize the annotations to validate (or train) one or more detections of the vehicle movements (in accordance with one or more embodiments). For example, the movement detection system 106 can utilize the annotations to determine whether a vehicle movement was detected accurately. In particular, the movement detection system 106 can utilize an annotation that identifies a corner and a corner severity to compare with detected vehicle movements at the annotated location. Based on the determined accuracy, the movement detection system 106 can adjust or configure one or more thresholds (or parameters) in regard to vehicle movement detection (e.g., in accordance with one or more embodiments).

In some embodiments, the movement detection system 106 can also receive user input that annotates (or marks) vehicle accidents within the map-based user interface 1024. For instance, the movement detection system 106 can detect cursor or touchscreen selections of points on the map-based user interface 1024 and provide an option to label a vehicle accident at the selected point. In particular, in one or more embodiments, the movement detection system 106 displays the path markers 1022 having color-coded or pattern-coded portions that indicate areas of unsafe driving behavior. Furthermore, in some embodiments, the movement detection system 106 displays the path markers 1022 with color-coded portions or pattern-coded portions (within the map-based user interface 1024) as reference points for unsafe vehicle driving behavior, such that a user can identify and label a vehicle accident within the map-based user interface 1024.

As mentioned above, the movement detection system 106 can provide, for display within a computing device, notifications that indicate various detected movements in accordance with one or more embodiments. For example, the movement detection system 106 can provide, for display within a computing device (e.g., a provider device), notifications that indicate handheld movements, vehicle movements (e.g., warnings for unsafe driving behavior), and/or reminders to mount a computing device (e.g., when detected to be not mounted). Indeed, the movement detection system 106 can provide, for display on a computing device, notifications corresponding to various combinations of detected events in accordance with one or more embodiments.

Figure 11:
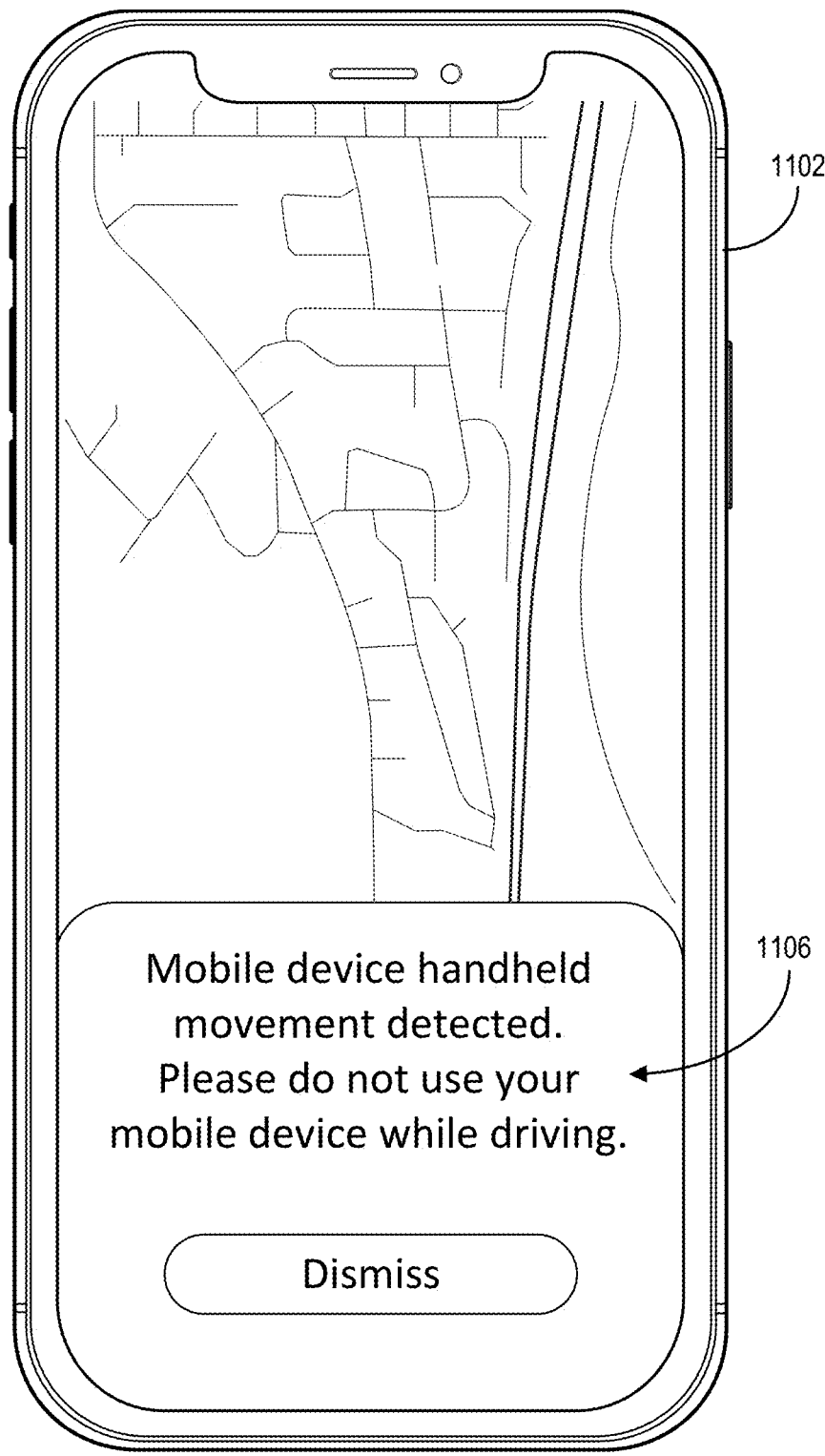
FIG. 11 illustrates an example graphical user interface of a movement detection system for displaying notifications in accordance with one or more embodiments.

As an example, FIG. 11 illustrates the movement detection system 106 providing, for display on a computing device 1102, a notification 1106 based on detecting a handheld movement on the computing device 1102. Indeed, as shown in FIG. 11, the notification 1106 indicates to a provider that a handheld movement was detected while driving and warns the provider to not use the computing device 1102 while operating a vehicle.

Figure 12:
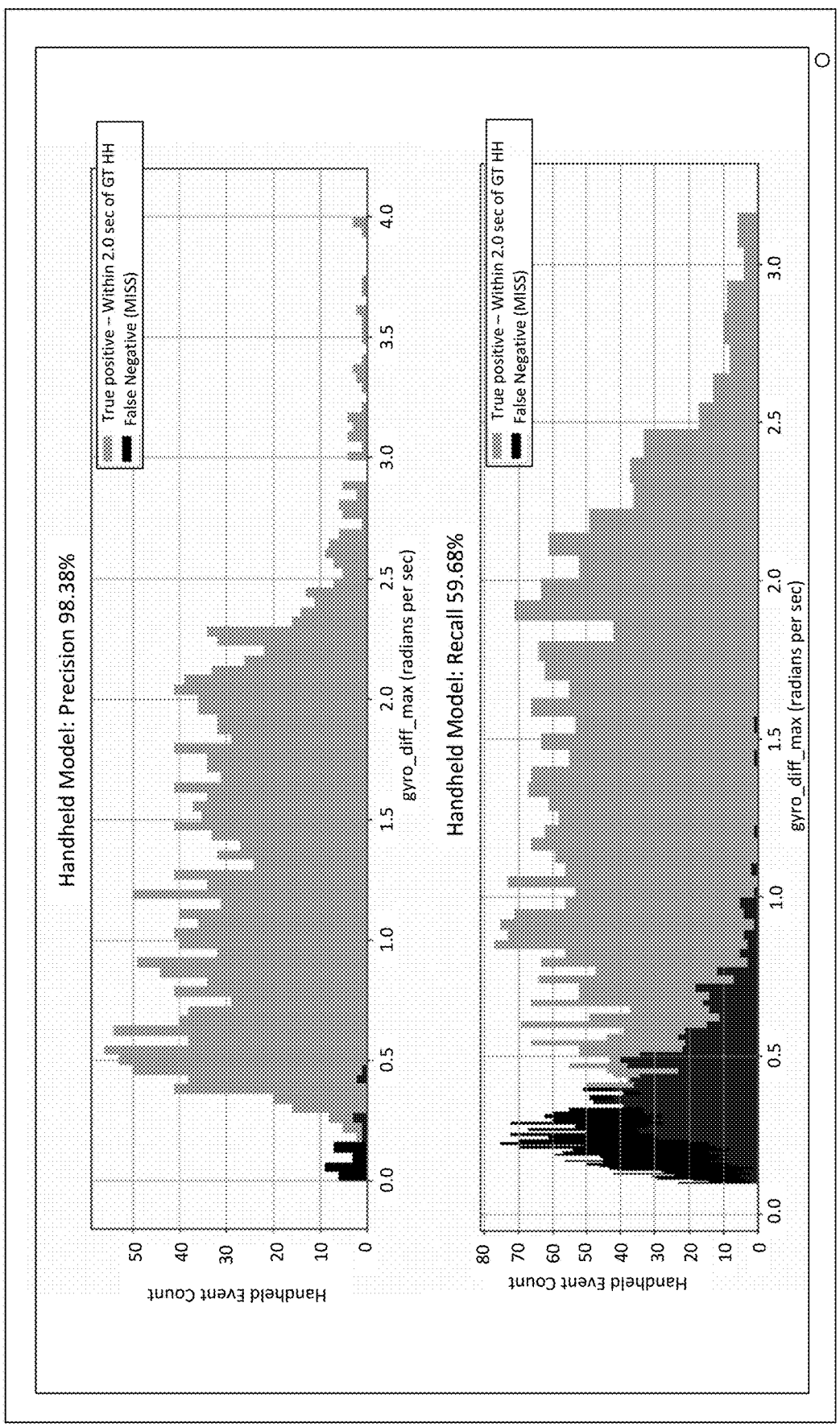
FIG. 12 illustrates testing results of a movement detection system in accordance with one or more embodiments.

As noted above, in some embodiments, the movement detection system 106 can detect movements of a computing device by hand (or otherwise by a person) with relatively high precision and recall. FIG. 12 illustrates testing results of the precision and recall of the movement detection system 106 in relation to handheld movements. As shown in FIG. 12, the movement detection system 106 can detect handheld movements with a precision rate of approximately ninety-eight percent. In addition, as shown in FIG. 12, the testing results indicate an approximately sixty percent recall rate for detecting handheld movements from computing devices (while maintaining the precision detected handheld movements). Indeed, compared to some conventional systems, the movement detection system 106 is able to detect handheld movements with a high precision and a high recall rate.

Figure 13:
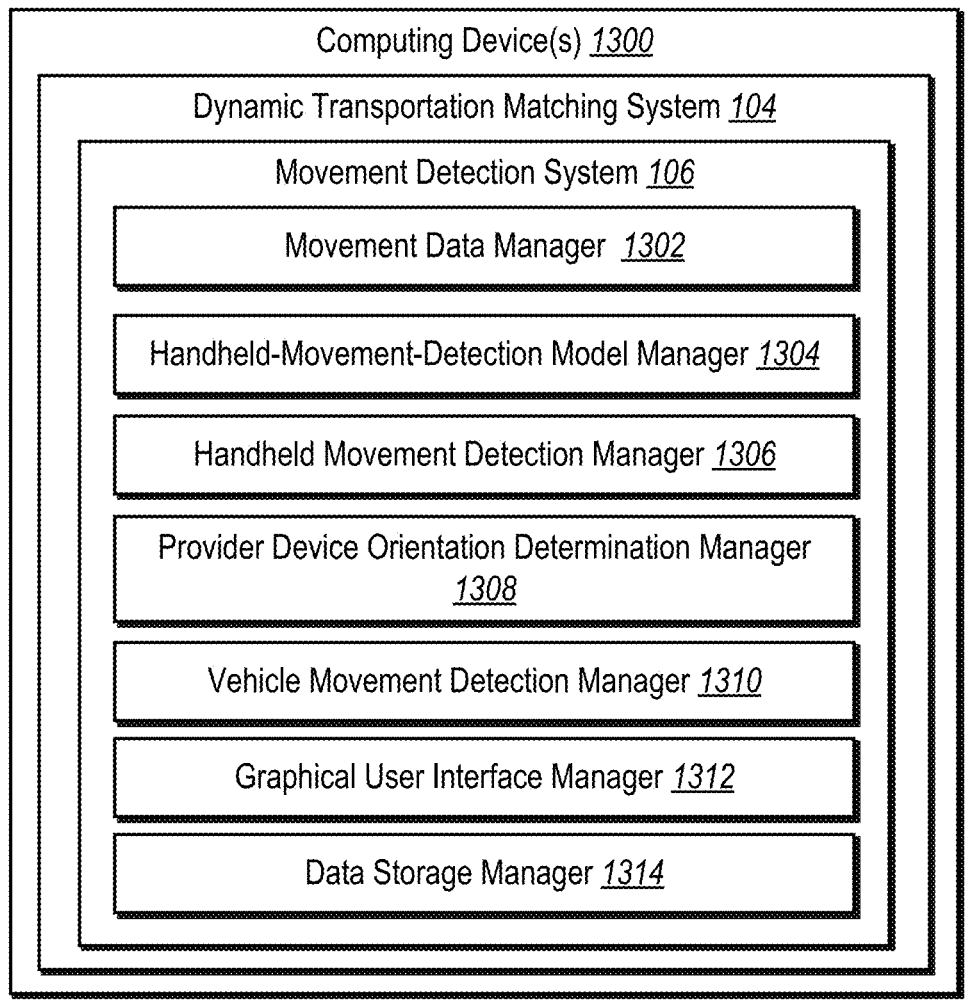
FIG. 13 illustrates a block diagram of a movement detection system in accordance with one or more embodiments.

Turning now to FIG. 13, additional detail will be provider regarding components and capabilities of the movement detection system in accordance with one or more embodiments. In particular, FIG. 13 illustrates the movement detection system 106 executed by computing device(s) 1300 (e.g., the server device(s) 102, the provider devices 110 and 116, the secured device 114). As shown in FIG. 13, the computing device(s) 1300 includes or hosts the dynamic transportation matching system 104 and the movement detection system 106. The movement detection system 106 includes a movement data manager 1302, a handheld-movement-detection model manager 1304, a handheld movement detection manager 1306, a provider device orientation determination manager 1308, a vehicle movement detection manager 1310, a graphical user interface manager 1312, and a data storage manager 1314.

As just mentioned and as illustrated in FIG. 13, the movement detection system 106 includes the movement data manager 1302. For instance, the movement data manager 1302 receives (or obtains) movement data from one or more sensory components of a provider device as described above (e.g., in relation to FIGS. 2-5 and FIGS. 7-8). In some instances, the movement data manger receives (or obtains) movement data from a computing device secured to a vehicle and movement data from a computing device (e.g., provider device) that is moveable from a vehicle as described above (e.g., in relation to FIG. 2).

Furthermore, as shown in FIG. 13, the movement detection system 106 includes the handheld-movement-detection model manager 1304. For example, the handheld-movement-detection model manager 1304 configures and/or adjusts parameters of a handheld-movement-detection model as described above (e.g., in relation to FIG. 2). In particular, in some instances, the handheld-movement-detection model manager 1304 utilizes movement data deviations between a secured device and a moveable device to adjust parameters of a handheld-movement-detection model as described above (e.g., in relation to FIG. 2). For instance, the handheld-movement-detection model manager 1304 can display movement data deviations with input tools to receive configurations (or adjustments) from a user to configure a handheld-movement-detection model as described above (e.g., in relation to FIG. 2).

Additionally, as shown in FIG. 13, the movement detection system 106 includes the handheld movement detection manager 1306. For example, the handheld movement detection manager 1306 can utilize a handheld-movement-detection model with movement data from a provider device to detect handheld movements of the provider device as described above (e.g., in relation to FIGS. 3-5). In particular, the handheld movement detection manager 1306 can generate filtered signals from movement data of a provider device and convert the filtered signals into movement-classification signals for one or more time periods as described above (e.g., in relation to FIGS. 3-5). Indeed, the handheld movement detection manager 1306 can utilize the movement-classification signals for one or more time periods to determine the presence or absence of handheld movement for the provider device as described above (e.g., in relation to FIGS. 3-5).

Furthermore, as shown in FIG. 13, the movement detection system 106 includes the provider device orientation determination manager 1308. For instance, the provider device orientation determination manager 1308 removes one or more instances of detected handheld movements from movement data of a provider device and utilizes pose estimation to estimate a pose of the provider device as described above (e.g., in relation to FIGS. 6 and 7). Indeed, the provider device orientation determination manager 1308 determines a pose (or orientation) of a provider device by utilizing determined device motion in relation to determined vehicle motion as described above (e.g., in relation to FIGS. 6 and 7). In addition, the provider device orientation determination manager 1308 determines whether a provider device is mounted within a vehicle (e.g., a mount event) using a determined pose of the provider device as described above (e.g., in relation to FIGS. 6 and 7).

As further shown in FIG. 13, the movement detection system 106 includes the vehicle movement detection manager 1310. In one or more embodiments, the vehicle movement detection manager 1310, upon determining that a provider device is mounted, utilizes movement data such as accelerometer data, rotation data, GPS data, and speed data to remove an estimated gravity (e.g., a gravitational force) and to estimate bearing, rotation, and acceleration information for a vehicle corresponding to the provider device as described above (e.g., in relation to FIGS. 6 and 8). Indeed, the vehicle movement detection manager 1310 utilizes determined GPS bearing changes, gyroscope rotations, and lateral accelerations to detect acceleration and braking events of a vehicle as described above (e.g., in relation to FIGS. 6 and 8). Furthermore, the vehicle movement detection manager 1310 can also detect candidate corners using GPS bearing changes and gyroscope rotations from a provider device, estimate acceleration for the candidate corners, and filter the candidate corners based on pose, gyroscope rotation, and acceleration to detect cornering events as described above (e.g., in relation to FIGS. 6 and 8).

In addition, as shown in FIG. 13, the movement detection system 106 includes the graphical user interface manager 1312. The graphical user interface manager 1312 can display movement data obtained from both moveable and secured computing devices within a graphical user interface as a comparison tool as described above (e.g., in relation to FIGS. 9A-9B). Furthermore, the graphical user interface manager 1312 can display a map-based graphical user interface that utilizes one or more markers to indicate detected events and intensities of the detected events (e.g., detected via a provider device) within a certain time and location as described above (e.g., in relation to FIG. 10). Moreover, the graphical user interface manager 1312 can display, on a provider device, notifications that indicate various detected movements (e.g., handheld movements and/or vehicle movements) as described above (e.g., in relation to FIG. 11).

Additionally, as shown in FIG. 13, the movement detection system 106 can include the data storage manager 1314. The data storage manager 1314 can communicate with any of the other components of the movement detection system 106 to obtain and/or provide data. For instance, the data storage manager 1314 can include data such as movement data (e.g., accelerometer data, gyroscope data, GPS data, device characteristics) of one or more devices (e.g., provider devices, devices secured to vehicles). In addition, the data storage manager 1314 can include data such as handheld-movement-detection model data (e.g., filtered signals, parameters such as signal thresholds, movement-classification signals). Furthermore, the data storage manager 1314 can include data such as pose estimation data (e.g., provider device axes data, mount event data) and/or data such as vehicle movement data (e.g., gravity estimation data, provider device GPS bearing change data, rotation data, acceleration data, acceleration event data, braking event data, cornering event data). Moreover, the data storage manager 1314 can include data such as graphical user interface data to generate, transmit, display, and/or receive interactions in accordance with one or more embodiments (e.g., movement data deviation data, input tools data, handheld movement event data, mounting event data, vehicle movement event data, vehicle movement marker data, notifications data).

In one or more embodiments, each of the components of the movement detection system 106 are in communication with other components using any suitable communication technologies. Additionally, the components of the movement detection system 106 can be in communication with one or more other devices including other computing devices of a user, server devices (e.g., cloud storage devices), licensing servers, or other devices/systems. It will be recognized that although the components of the movement detection system 106 are shown to be separate in FIG. 13, any of the subcomponents may be combined into fewer components, such as into a single component, or divided into more components as may serve a particular implementation. Furthermore, although the components of FIG. 13 are described in connection with the movement detection system 106, at least some of the components for performing operations in conjunction with the movement detection system 106 described herein may be implemented on other devices within the environment.

The components of the movement detection system 106 can include software, hardware, or both. For example, the components of the movement detection system 106 can include one or more instructions stored on a computer-readable storage medium and executable by processors of one or more computing (or computer) devices (e.g., the computing device(s) 1300). When executed by the one or more processors, the computer-executable instructions of the movement detection system 106 can cause the computing device(s) 1300 to perform the operations described herein. Alternatively, the components of the movement detection system 106 can include hardware, such as a special purpose processing device to perform a certain function or group of functions. Additionally, or alternatively, the components of the movement detection system 106 can include a combination of computer-executable instructions and hardware.

Furthermore, the components of the movement detection system 106 performing the functions described herein with respect to the movement detection system 106 may, for example, be implemented as part of a stand-alone application, as a module of an application, as a plug-in for applications, as a library function or functions that may be called by other applications, and/or as a cloud-computing model. Thus, the components of the movement detection system 106 may be implemented as part of a stand-alone application on a personal computing device or a mobile device.

Figure 14:
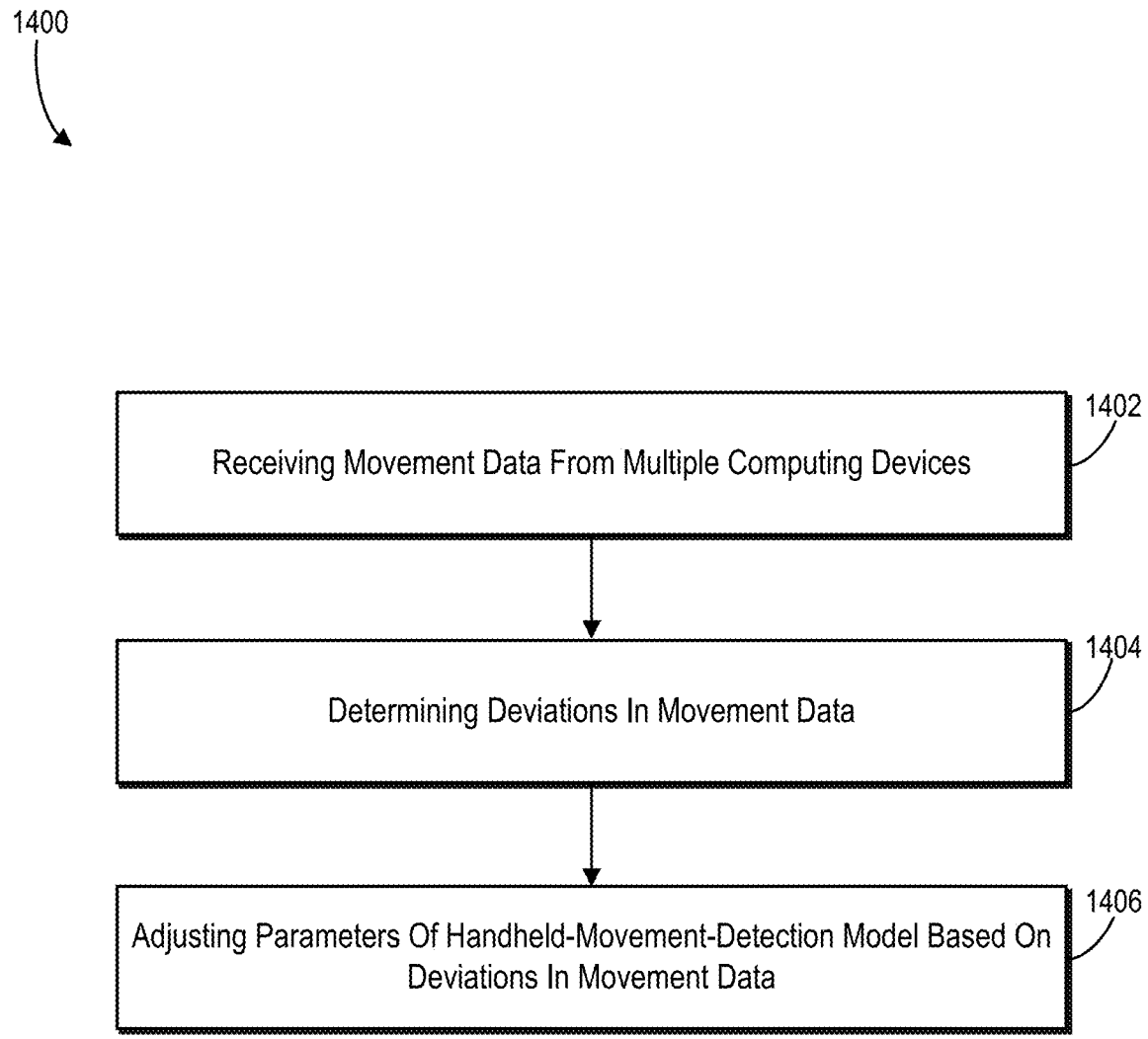
FIG. 14 illustrates a flowchart of a series of acts for configuring a handheld-movement-detection model in accordance with one or more embodiments.

Turning now to FIG. 14, this figure shows a flowchart of a series of acts 1400 for configuring a handheld-movement-detection model in accordance with one or more embodiments. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable storage medium can comprise instructions that, when executed by one or more processors, cause a computing device to perform the acts depicted in FIG. 14. In still further embodiments, a system can perform the acts of FIG. 14.

As shown in FIG. 14, the series of acts 1400 include an act 1402 of receiving movement data from multiple computing devices. In particular, the act 1402 can include receiving a first set of movement data from a first computing device secured to a vehicle and a second set of movement data from a second computing device moveable from the vehicle. For example, a first set of movement data and a second set of movement data can each include accelerometer data and/or gyroscope data. Furthermore, the act 1402 can include modifying a first set of movement data by removing sensor biases from the first set of movement data based at least on one or more characteristics of a first computing device. Additionally, the act 1402 can include modifying a second set of movement data by removing sensor biases from the second set of movement data based at least on one or more characteristics of a second computing device.

As shown in FIG. 14, the series of acts 1400 include an act 1404 of determining deviations in movement data. In particular, the act 1404 can include determining one or more deviations between a first set of movement data received from a first computing device and a second set of movement data received from a second computing device. Furthermore, the act 1404 can include identifying (for a time period) a movement-data deviation indicating a movement of a second computing device moveable from a vehicle based on one or more deviations (between movement data from a first computing device secured to a vehicle and from a second computing device moveable from the vehicle). Moreover, the act 1404 can include providing, for display within a graphical user interface (across a time period), a subset of a first set of movement data received from a first computing device and a subset of a second set of movement data received from a second computing device.

As shown in FIG. 14, the series of acts 1400 include an act 1406 of adjusting parameters of a handheld-movement-detection model based on deviations in movement data. In particular, the act 1406 can include adjusting parameters of a handheld-movement-detection model to detect handheld movements of computing devices based on one or more deviations between a first set of movement data (from a first computing device secured to a vehicle) and a second set of movement data (from a second computing device moveable from the vehicle). Moreover, the act 1406 can include adjusting parameters of a handheld-movement-detection model by adjusting an accelerometer-signal threshold and a rotation-signal threshold for the handheld-movement-detection model. Furthermore, the act 1406 can include adjusting parameters of a handheld-movement-detection model by adjusting signal thresholds based on one or more deviations between a first set of movement data (from a first computing device secured to a vehicle) and a second set of movement data (from a second computing device moveable from the vehicle).

Figure 15:
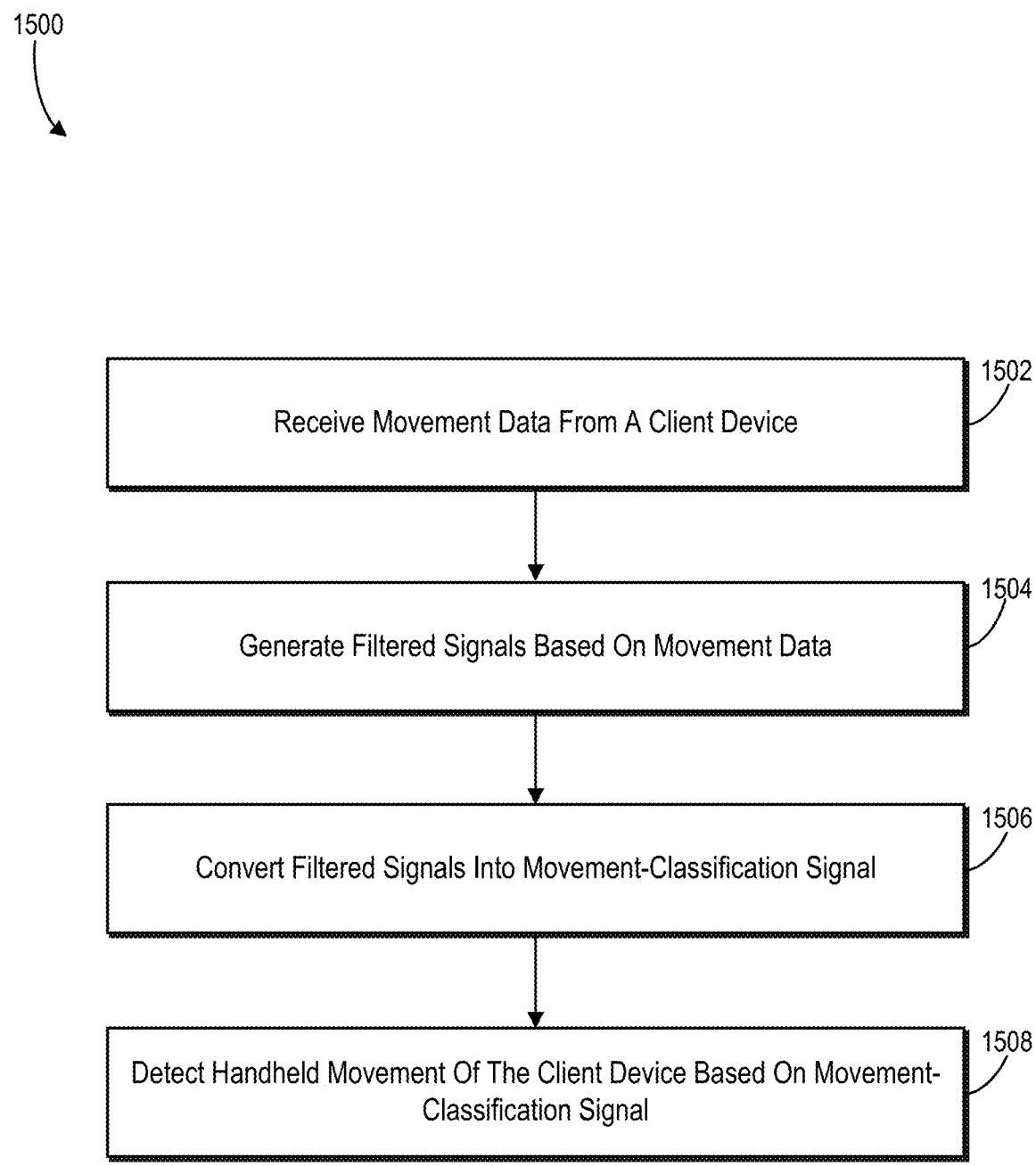
FIG. 15 illustrates a flowchart of a series of acts for utilizing a handheld-movement-detection model to detect handheld movements of a client device in accordance with one or more embodiments.

Turning now to FIG. 15, this figure shows a flowchart of a series of acts 1500 for utilizing a handheld-movement-detection model to detect handheld movements of a provider device (or computing device) in accordance with one or more embodiments. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer readable storage medium can comprise instructions that, when executed by one or more processors, cause a computing device to perform the acts depicted in FIG. 15. In still further embodiments, a system can perform the acts of FIG. 15.

As shown in FIG. 15, the series of acts 1500 include an act 1502 of receiving movement data from a provider device. In particular, the act 1502 can include receiving a set of movement data corresponding to a time period from a provider device (or computing device). For example, a set of movement data can include accelerometer data and/or gyroscope data from a provider device. As shown in FIG. 15, the series of acts 1500 include an act 1504 of generating filtered signals based on movement data. In particular, the act 1504 can include generating, utilizing a handheld-movement-detection model, filtered signals indicating device movement based on a set of movement data. In addition, the act 1504 can include generating (utilizing a handheld-movement-detection model) filtered signals indicating device movement by applying a high-pass filter and a low-pass filter to a set of movement data. Furthermore, the act 1504 can include generating filtered signals (from a set of movement data) by generating filtered variance-signals indicating device-movement variance.

As shown in FIG. 15, the series of acts 1500 include an act 1506 of converting filtered signals into a movement-classification signal. In particular, the act 1506 can include converting, utilizing a handheld-movement-detection model, filtered signals into a movement-classification signal based on signal thresholds (and/or by utilizing hysteretic signal thresholds). Furthermore, the act 1506 can include applying a signal bias correction to a movement-classification signal to reduce a time period for the movement-classification signal. For instance, a movement-classification signal can include a binary signal indicating a handheld movement of a provider device or no handheld movement of a provider device during a time period.

In addition, the act 1506 can include converting, utilizing a handheld-movement-detection model, filtered signals into initial movement-classification signals (that indicate handheld movement or no handheld movement during a time period). Moreover, the act 1506 can include applying at least one of a moving average filter or a median filter to initial movement-classification signals to generate moving-average signals. Furthermore, the act 1506 can include converting moving-average signals into (refined) movement-classification signals by comparing the moving-average signals to hysteretic signal thresholds. Additionally, the act 1506 can include converting filtered-variance signals into initial movement-classification signals (that indicate handheld movement of a client device or no handheld movement of the client device during a time period) based on variance-signal thresholds. Moreover, the act 1506 can include generating a (refined) movement-classification signal as the movement-classification signal by comparing moving-average signals to hysteretic variance thresholds.

As shown in FIG. 15, the series of acts 1500 include an act 1508 of detecting handheld movement of a provider device based on a movement-classification signal. In particular, the act 1508 can include detecting a handheld movement of a provider device (or computing device) during a time period based on a movement-classification signal. Furthermore, the act 1508 can include detecting a handheld movement of a provider device during a time period based on reducing the time period for a movement-classification signal. In addition, the act 1508 can include providing a notification, for display on a provider device, based on detecting a handheld movement of a provider device.

Moreover, the act 1508 can include detecting whether a handheld movement of a provider device (or computing device) occurs during a time period by detecting no handheld movement of the provider device during the time period. Additionally, the act 1508 can include determining an orientation of a provider device during a time period based on a set of movement data. Furthermore, the act 1508 can include detecting an acceleration event, a braking event, or a cornering event for a vehicle associated with a provider device by utilizing a set of movement data and an orientation of a provider device. In addition, the act 1508 can include providing, for display within a map-based graphical user interface, one or more markers corresponding to an acceleration event, a braking event, or a cornering event.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
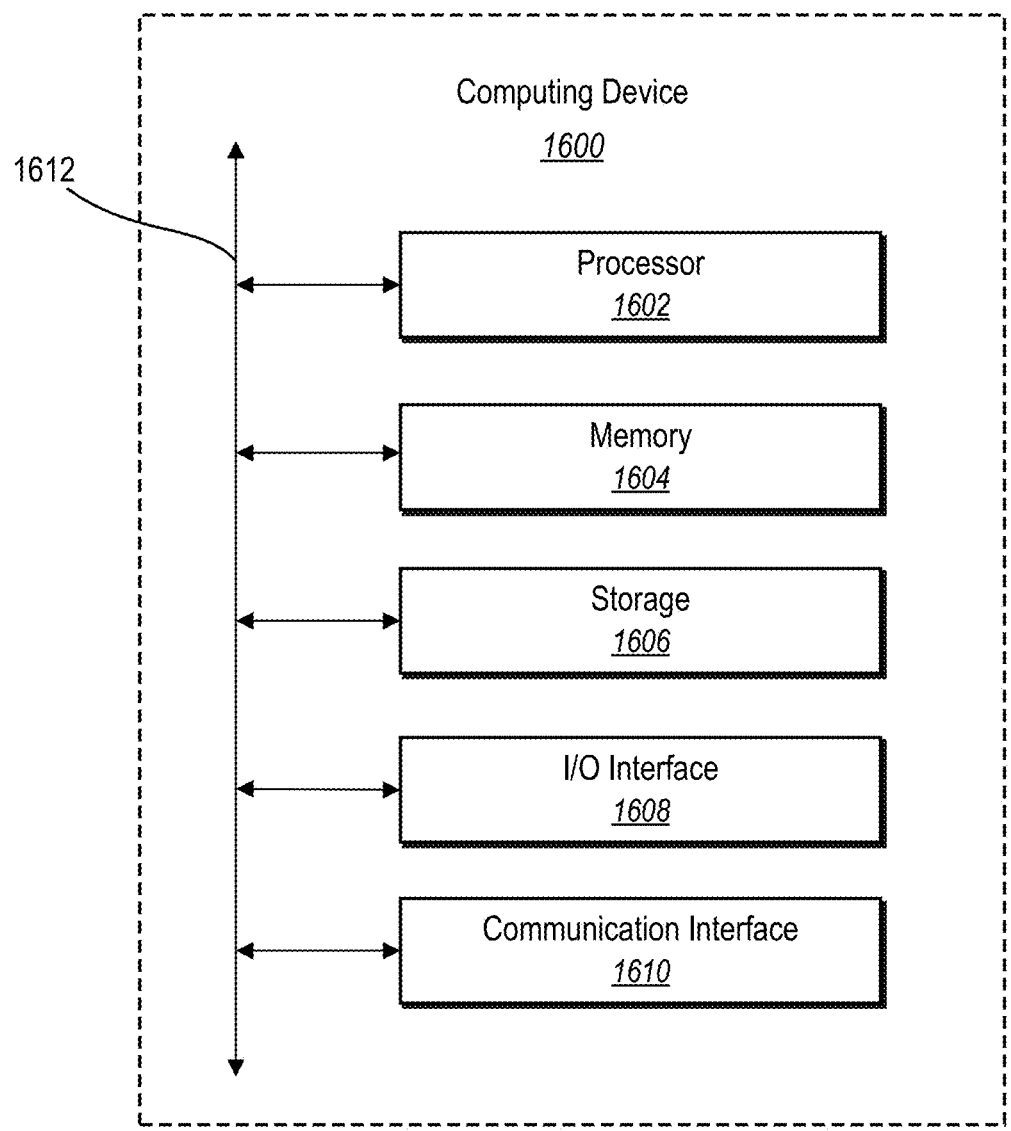
FIG. 16 illustrates a block diagram of a computing device in accordance with one or more embodiments.

FIG. 16 illustrates, in block diagram form, an exemplary computing device 1600 that may be configured to perform one or more of the processes described above. One will appreciate that the movement detection system 106 (or the dynamic transportation matching system 104) can comprise implementations of the computing device 1600, including, but not limited to, the devices or systems illustrated in the previous figures. As shown by FIG. 16, the computing device can comprise a processor 1602, memory 1604, a storage device 1606, an I/O interface 1608, and a communication interface 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive ("HDD"), flash memory, a Universal Serial Bus ("USB") drive or a combination of these or other storage devices.

The computing device 1600 also includes one or more input or output ("I/O") interface 1608, which are provided to allow a user (e.g., requester or provider) to provide input to (such as user strokes), receive output from, and otherwise transfer data to and from the computing device 1600. These I/O interface 1608 may include a mouse, keypad or a keyboard, a touch screen, camera, optical scanner, network interface, modem, other known I/O devices or a combination of such I/O interface 1608. The touch screen may be activated with a stylus or a finger.

The I/O interface 1608 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller ("NIC") or network adapter for communicating with an Ethernet or other wire-based network or a wireless NIC ("WNIC") or wireless adapter for communicating with a wireless network, such as a WI-FI. The computing device 1600 can further include a bus 1612. The bus 1612 can comprise hardware, software, or both that couples components of computing device 1600 to each other.

Figure 17:
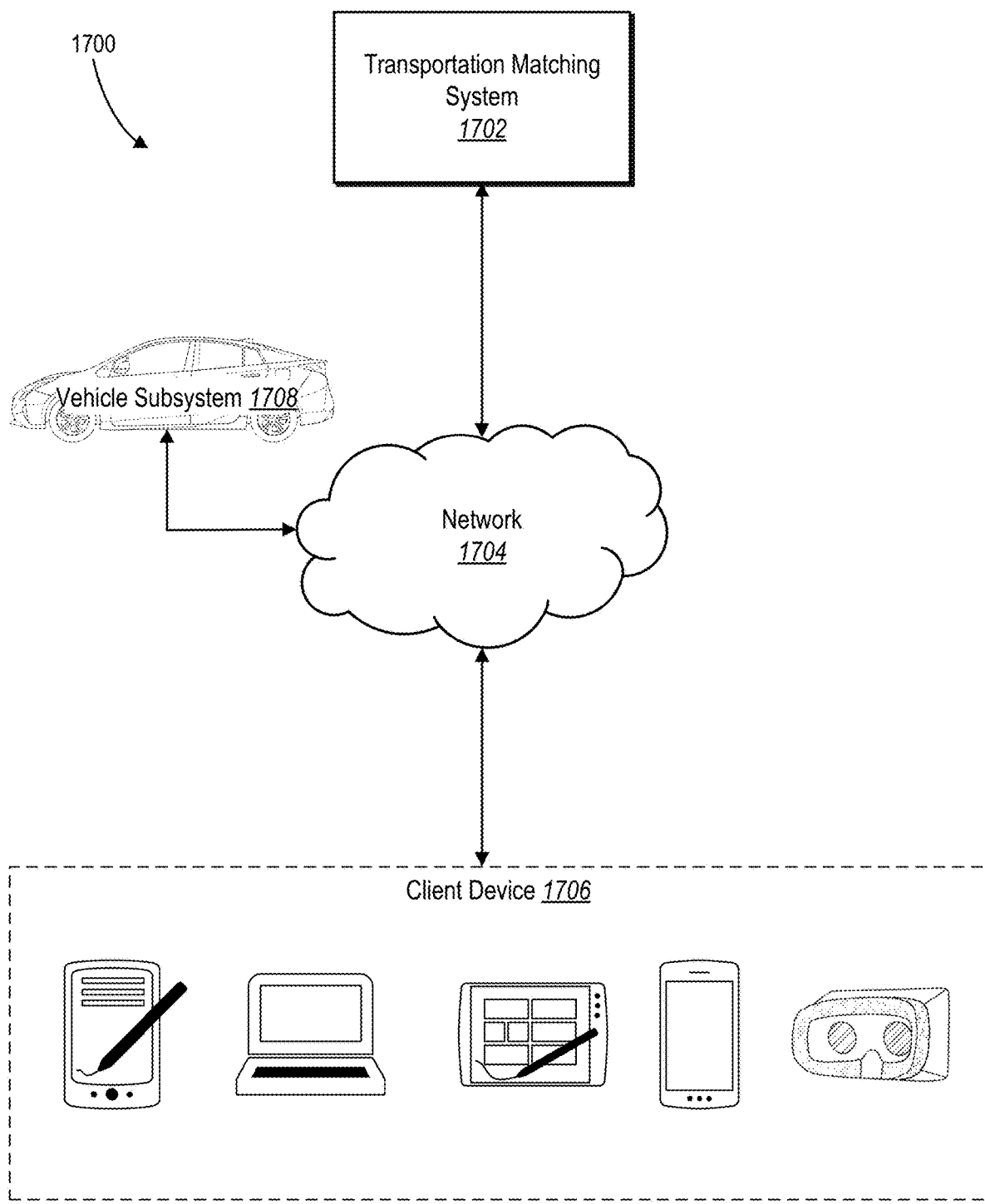
FIG. 17 illustrates an example environment for a transportation matching system in accordance with one or more embodiments.

FIG. 17 illustrates an example network environment 1700 of a transportation matching system 1702 (e.g., the dynamic transportation matching system 104). The network environment 1700 includes a client device 1706, a transportation matching system 1702, and a vehicle subsystem 1708 connected to each other by a network 1704. Although FIG. 17 illustrates a particular arrangement of the client device 1706, transportation matching system 1702, vehicle subsystem 1708, and network 1704, this disclosure contemplates any suitable arrangement of client device 1706, transportation matching system 1702, vehicle subsystem 1708, and network 1704. As an example, and not by way of limitation, two or more of client device 1706, transportation matching system 1702, and vehicle subsystem 1708 communicate directly, bypassing network 1704. As another example, two or more of client device 1706, transportation matching system 1702, and vehicle subsystem 1708 may be physically or logically co-located with each other in whole or in part. Moreover, although FIG. 17 illustrates a particular number of client devices 1706, transportation matching systems 1702, vehicle subsystems 1708, and networks 1704, this disclosure contemplates any suitable number of client devices 1706, transportation matching systems 1702, vehicle subsystems 1708, and networks 1704. As an example, and not by way of limitation, network environment 1700 may include multiple client device 1706, transportation matching systems 1702, vehicle subsystems 1708, and networks 1704.

This disclosure contemplates any suitable network 1704. As an example, and not by way of limitation, one or more portions of network 1704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1704 may include one or more networks 1704.

Links may connect client device 1706, transportation matching system 1702, and vehicle subsystem 1708 to network 1704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, client device 1706 may be an electronic device including hardware, software, or embedded logic components or a combination of two or more such components and capable of carrying out the appropriate functionalities implemented or supported by client device 1706. As an example, and not by way of limitation, a client device 1706 may include any of the computing devices discussed above in relation to FIG. 16. A client device 1706 may enable a network user at client device 1706 to access network 1704. A client device 1706 may enable its user to communicate with other users at other client devices 1706.

In particular embodiments, client device 1706 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1706 one or more Hyper Text Markup Language ("HTML") files responsive to the HTTP request. Client device 1706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1702 may be a network-addressable computing system that can host a transportation matching network. Transportation matching system 1702 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 1702. In addition, the transportation matching system may manage identities of service requesters such as users/requesters. In particular, the transportation matching system 1702 may maintain requester data such as driving/riding histories, personal data, or other user data in addition to navigation and/or traffic management services or other location services (e.g., GPS services).

In particular embodiments, the transportation matching system 1702 may manage transportation matching services to connect a user/requester with a vehicle and/or provider. By managing the transportation matching services, the transportation matching system 1702 can manage the distribution and allocation of resources from the vehicle subsystem 1708 and user resources such as GPS location and availability indicators, as described herein.

Transportation matching system 1702 may be accessed by the other components of network environment 1700 either directly or via network 1704. In particular embodiments, transportation matching system 1702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1706, or a transportation matching system 1702 to manage, retrieve, modify, add, or delete, the information stored in data store.

In particular embodiments, transportation matching system 1702 may provide users with the ability to take actions on various types of items or objects, supported by transportation matching system 1702. As an example, and not by way of limitation, the items and objects may include transportation matching networks to which users of transportation matching system 1702 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1702 or by an external system of a third-party system, which is separate from transportation matching system 1702 and coupled to transportation matching system 1702 via a network 1704.

In particular embodiments, transportation matching system 1702 may be capable of linking a variety of entities. As an example, and not by way of limitation, transportation matching system 1702 may enable users to interact with each other or other entities, or to allow users to interact with these entities through an application programming interfaces ("API") or other communication channels.

In particular embodiments, transportation matching system 1702 may include a variety of servers, sub-systems, programs, modules, logs, and data stores. In particular embodiments, transportation matching system 1702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1702 may also include suitable components such as network interfaces, security mechanisms, load balancers, failover servers, management-and-network-operations consoles, other suitable components, or any suitable combination thereof. In particular embodiments, transportation matching system 1702 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1702 and one or more client devices 1706. An action logger may be used to receive communications from a web server about a user's actions on or off transportation matching system 1702. In conjunction with the action log, a third-party-content-object log may be maintained of user exposures to third-party-content objects. A notification controller may provide information regarding content objects to a client device 1706. Information may be pushed to a client device 1706 as notifications, or information may be pulled from client device 1706 responsive to a request received from client device 1706. Authorization servers may be used to enforce one or more privacy settings of the users of transportation matching system 1702. A privacy setting of a user determines how particular information associated with a user can be shared. The authorization server may allow users to opt in to or opt out of having their actions logged by transportation matching system 1702 or shared with other systems, such as, for example, by setting appropriate privacy settings. Third-party-content-object stores may be used to store content objects received from third parties. Location stores may be used for storing location information received from client devices 1706 associated with users.

In addition, the vehicle subsystem 1708 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1708 can include an autonomous vehicle—i.e., a vehicle that does not require a human operator. In these embodiments, the vehicle subsystem 1708 can perform maneuvers, communicate, and otherwise function without the aid of a human provider, in accordance with available technology.

In particular embodiments, the vehicle subsystem 1708 may include one or more sensors incorporated therein or associated thereto. For example, sensor(s) can be mounted on the top of the vehicle subsystem 1708 or else can be located within the interior of the vehicle subsystem 1708. In certain embodiments, the sensor(s) can be located in multiple areas at once—i.e., split up throughout the vehicle subsystem 1708 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1708 may include a communication device capable of communicating with the client device 1706 and/or the transportation matching system 1702. For example, the vehicle subsystem 1708 can include an on-board computing device communicatively linked to the network 1704 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    configuring, at one or more server devices, a handheld-movement-detection model by:
        receiving a first set of ground truth movement data from a first computing device secured to a vehicle and a second set of movement data from a second computing device moveable from the vehicle, wherein ground truth movement data corresponds to an absence of handheld movement;
        determining one or more ground truth deviations between the first set of ground truth movement data received from the first computing device and the second set of movement data received from the second computing device; and
        based on user interactions within a graphical user interface of a third computing device, adjusting signal threshold parameters of a handheld-movement-detection model to detect handheld movements of computing devices based on the one or more ground truth deviations between the first set of ground truth movement data and the second set of movement data; and
    utilizing, at the one or more server devices, the handheld-movement-detection model by:
        receiving a set of movement data corresponding to a time period via a fourth computing device;
        generating, by the handheld-movement-detection model with the set of movement data of the fourth computing device, filtered signals indicating movement based on the set of movement data;
        converting, by the handheld-movement-detection model, the filtered signals into a movement-classification signal based on signal thresholds corresponding to the signal threshold parameters of the handheld-movement-detection model; and
        detecting a handheld movement of the fourth computing device during the time period based on the movement-classification signal.

2. The method of claim 1, wherein the first set of ground truth movement data and the second set of movement data each comprise accelerometer data and gyroscope data.

3. The method of claim 1, further comprising adjusting the signal threshold parameters of the handheld-movement-detection model by adjusting an accelerometer-signal threshold and a rotation-signal threshold for the handheld-movement-detection model.

4. The method of claim 1, further comprising generating, by the handheld-movement-detection model, the filtered signals by applying a high-pass filter and a low-pass filter to the set of movement data of the fourth computing device.

5. The method of claim 1, further comprising:
    modifying the first set of ground truth movement data by removing sensor biases from the first set of ground truth movement data based at least on one or more characteristics of the first computing device; and
    modifying the second set of movement data by removing sensor biases from the second set of movement data based at least on one or more characteristics of the second computing device.

6. The method of claim 1, further comprising providing a notification, for display on the fourth computing device, based on detecting the handheld movement of the fourth computing device.

7. A system comprising:
    at least one processor; and
    at least one non-transitory computer-readable storage medium storing instructions that, when executed by the at least one processor, cause the system to:
        configure, at a server device, a handheld-movement-detection model by:
            receiving a first set of ground truth movement data from a first computing device secured to a vehicle and a second set of movement data from a second computing device moveable from the vehicle, wherein ground truth movement data corresponds to an absence of handheld movement;
            determining one or more ground truth deviations between the first set of ground truth movement data received from the first computing device and the second set of movement data received from the second computing device; and based on user interactions within a graphical user interface of a third computing device, adjusting signal threshold parameters of a handheld-movement-detection model to detect handheld movements of computing devices based on the one or more ground truth deviations between the first set of ground truth movement data and the second set of movement data; and utilize, at the server device, the handheld-movement-detection model by:

receiving a set of movement data corresponding to a time period via a fourth computing device;

generating, by the handheld-movement-detection model with the set of movement data of the fourth computing device, filtered signals indicating device movement based on the set of movement data;

converting, by the handheld-movement-detection model, the filtered signals into a movement-classification signal based on signal thresholds corresponding to the signal threshold parameters of the handheld-movement-detection model; and detecting a handheld movement of the fourth computing device during the time period based on the movement-classification signal.

8. The system of claim 7, further comprising instructions that, when executed by the at least one processor, cause the system to provide a notification, for display on the fourth computing device, based on detecting the handheld movement of the fourth computing device.

9. The system of claim 7, wherein the set of movement data of the fourth computing device comprises accelerometer data and gyroscope data.

10. The system of claim 7, further comprising instructions that, when executed by the at least one processor, cause the system to generate, by the handheld-movement-detection model, the filtered signals indicating the device movement by applying a high-pass filter and a low-pass filter to the set of movement data of the fourth computing device.

11. The system of claim 7, further comprising instructions that, when executed by the at least one processor, cause the system to utilize the handheld-movement-detection model by:

converting the filtered signals into initial movement-classification signals;

applying at least one of a moving average filter or a median filter to the initial movement-classification signals to generate moving-average signals; and converting the moving-average signals into movement-classification signals by comparing the moving-average signals to hysteretic signal thresholds.

12. The system of claim 7, wherein the movement-classification signal comprises a binary signal indicating a handheld movement of the fourth computing device or no handheld movement of the fourth computing device during the time period.

13. The system of claim 7, further comprising instructions that, when executed by the at least one processor, cause the system to utilize the handheld-movement-detection model by:

applying a signal bias correction to the movement-classification signal to reduce a time range for the movement-classification signal; and detecting the handheld movement of the fourth computing device during the time period based on reducing the time range for the movement-classification signal.

14. A non-transitory computer-readable medium comprising instructions that, when executed by at least one processor, cause one or more server computing devices to:

configure a handheld-movement-detection model by:

receiving a first set of ground truth movement data from a first computing device secured to a vehicle and a second set of movement data from a second computing device moveable from the vehicle, wherein ground truth movement data corresponds to an absence of handheld movement;

determining one or more ground truth deviations between the first set of ground truth movement data received from the first computing device and the second set of movement data received from the second computing device; and based on user interactions within a graphical user interface of a third computing device, adjusting signal threshold parameters of a handheld-movement-detection model to detect handheld movements of computing devices based on the one or more ground truth deviations between the first set of ground truth movement data and the second set of movement data; and utilize the handheld-movement-detection model by:

receiving a set of movement data corresponding to a time period via a fourth computing device;

generating, by the handheld-movement-detection model with the set of movement data of the fourth computing device, filtered signals indicating device movement based on the set of movement data;

converting, by the handheld-movement-detection model, the filtered signals into a movement-classification signal based on signal thresholds corresponding to the signal threshold parameters of the handheld-movement-detection model; and detecting a handheld movement of the fourth computing device during the time period based on the movement-classification signal.

15. The non-transitory computer-readable medium of claim 14, further comprising instructions that, when executed by the at least one processor, cause the one or more server computing devices to utilize the handheld-movement-detection model by:

generating the filtered signals by generating filtered variance-signals indicating device-movement variance; and converting the filtered variance-signals into initial movement-classification signals that indicate a handheld movement of the fourth computing device or no handheld movement of the fourth computing device during the time period based on variance-signal thresholds corresponding to the handheld-movement-detection model.

16. The non-transitory computer-readable medium of claim 15, further comprising instructions that, when executed by the at least one processor, cause the one or more server computing devices to utilize the handheld-movement-detection model by converting the filtered signals into the movement-classification signal by:

applying at least one of a moving average filter or a median filter to the initial movement-classification signals to generate moving-average signals; and generating a refined movement-classification signal as the movement-classification signal by comparing the moving-average signals to hysteretic variance thresholds.

17. The non-transitory computer-readable medium of claim 14, further comprising instructions that, when executed by the at least one processor, cause the one or more server computing devices to utilize the handheld-movement-detection model by:
- applying a signal bias correction to the movement-classification signal to reduce the time period for the movement-classification signal; and
- detecting the handheld movement of the fourth computing device during the time period based on reducing the time period for the movement-classification signal.

18. The non-transitory computer-readable medium of claim 14, wherein the movement-classification signal comprises a binary signal indicating a handheld movement of the fourth computing device or no handheld movement of the fourth computing device during the time period.

19. The non-transitory computer-readable medium of claim 14, further comprising instructions that, when executed by the at least one processor, cause the one or more server computing devices to utilize the handheld-movement-detection model by:
- detecting no handheld movement of the fourth computing device during an additional time period;
- determining an orientation of the fourth computing device during the additional time period based on a set of additional movement data; and
- detecting an acceleration event, a braking event, or a cornering event for a vehicle associated with the fourth computing device by utilizing the set of additional movement data and the orientation of the fourth computing device.

20. The non-transitory computer-readable medium of claim 19, further comprising instructions that, when executed by the at least one processor, cause the one or more server computing devices to provide, for display within a map-based graphical user interface of the third computing device, one or more markers corresponding to the acceleration event, the braking event, or the cornering event.

* * * * *